(12) United States Patent
Asai et al.

(10) Patent No.: US 9,581,996 B2
(45) Date of Patent: Feb. 28, 2017

(54) APPARATUS, METHOD, AND COMPUTER-READABLE MEDIUM FOR MANAGING ABNORMALITY DATA MEASURED IN THE SUBSTRATE MANUFACTURING PROCESS

(75) Inventors: Kazuhide Asai, Toyama (JP); Hideto Shimizu, Toyama (JP); Kayoko Yashiki, Toyama (JP)

(73) Assignee: HITACHI KOKUSAI ELECRIC INC., Tokyo (JP)

( * ) Notice: Subject to any disclaimer, the term of this patent is extended or adjusted under 35 U.S.C. 154(b) by 1055 days.

(21) Appl. No.: 13/433,713

(22) Filed: Mar. 29, 2012

(65) Prior Publication Data

US 2012/0253724 A1    Oct. 4, 2012

(30) Foreign Application Priority Data

Apr. 1, 2011    (JP) .................................. 2011-81467

(51) Int. Cl.
G05B 23/02    (2006.01)

(52) U.S. Cl.
CPC ................................ G05B 23/0235 (2013.01)

(58) Field of Classification Search
CPC .. G01M 99/00; G05B 23/024; G05B 23/0235
See application file for complete search history.

(56) References Cited

U.S. PATENT DOCUMENTS

| | | | |
|---|---|---|---|
| 7,080,294 B1 * | 7/2006 | Weber | 714/704 |
| 2006/0058898 A1 * | 3/2006 | Emigholz et al. | 700/29 |
| 2007/0255442 A1 | 11/2007 | Nakamura et al. | |
| 2008/0288217 A1 * | 11/2008 | Akao | 702/187 |

FOREIGN PATENT DOCUMENTS

| | | | |
|---|---|---|---|
| JP | 2000-243678 A | 9/2000 |
| JP | 2002-100547 A | 4/2002 |
| JP | 2005-535130 A | 11/2005 |
| JP | 2007-250748 A | 9/2007 |
| TW | 381219 A1 | 4/1987 |
| TW | 200703444 A1 | 3/1995 |
| TW | I320518 A1 | 3/1995 |
| WO | 2004/013715 A1 | 2/2004 |

OTHER PUBLICATIONS

Taiwanese Office Action, Taiwanese Patent Appln. No. 101111352, Oct. 14, 2010, 7 pp.

* cited by examiner

*Primary Examiner* — Gregory J Toatley
*Assistant Examiner* — Kyle R Quigley
(74) *Attorney, Agent, or Firm* — Volpe and Koenig, P.C.

(57) ABSTRACT

A management device includes a measurement data storage unit configured to store measurement data transmitted from a substrate processing apparatus; a setting unit configured to set an item of the measurement data as a determination target, reference data, and upper and lower limit values with respect to the reference data; a counting unit configured to count the number of times that the value of the measurement data corresponding to the item exceeds the upper and lower limit values; and a determining unit configured to determine that the measurement data as a determination target is abnormal, when the counted number exceeds a predetermined value.

17 Claims, 20 Drawing Sheets

FIG. 7

| TIME | MASTER DATA VALUE | UPPER LIMIT VALUE | LOWER LIMIT VALUE |
|---|---|---|---|
| 10:00:00 | md0 | (md0) +10 | (md0) −5 |
| 10:00:01 | md1 | (md1) +10 | (md1) −5 |
| 10:00:02 | md2 | (md2) +10 | (md2) −5 |
| 10:00:03 | md3 | (md3) +10 | (md3) −5 |
| 10:00:04 | md4 | (md4) +10 | (md4) −5 |
| 10:00:05 | md5 | (md5) +10 | (md5) −5 |
| 10:00:06 | md6 | (md6) +10 | (md6) −5 |
| 10:00:07 | md7 | (md7) +10 | (md7) −5 |
| 10:00:08 | md8 | (md8) +10 | (md8) −5 |
| 10:00:09 | md9 | (md9) +10 | (md9) −5 |
| 10:00:10 | md10 | (md10) +10 | (md10) −5 |
| 10:00:11 | md11 | (md11) +10 | (md11) −5 |
| 10:00:12 | md12 | (md12) +10 | (md12) −5 |
| 10:00:13 | md13 | (md13) +10 | (md13) −5 |
| 10:00:14 | md14 | (md14) +10 | (md14) −5 |
| 10:00:15 | md15 | (md15) +10 | (md15) −5 |
| 10:00:16 | md16 | (md16) +10 | (md16) −5 |
| 10:00:17 | md17 | (md17) +10 | (md17) −5 |
| 10:00:18 | md18 | (md18) +10 | (md18) −5 |
| 10:00:19 | md19 | (md19) +10 | (md19) −5 |
| 10:00:20 | md20 | (md20) +10 | (md20) −5 |
| 10:00:21 | md21 | (md21) +10 | (md21) −5 |
| 10:00:22 | md22 | (md22) +10 | (md22) −5 |
| 10:00:23 | md23 | (md23) +10 | (md23) −5 |
| 10:00:24 | md24 | (md24) +10 | (md24) −5 |
| 10:00:25 | md25 | (md25) +10 | (md25) −5 |
| 10:00:26 | md26 | (md26) +10 | (md26) −5 |
| 10:00:27 | md27 | (md27) +10 | (md27) −5 |
| 10:00:28 | md28 | (md28) +10 | (md28) −5 |
| 10:00:29 | md29 | (md29) +10 | (md29) −5 |
| 10:00:30 | md30 | (md30) +10 | (md30) −5 |

BAND

FIG. 8

| TIME | MASTER DATA VALUE | UPPER LIMIT VALUE | LOWER LIMIT VALUE | MONITOR DATA VALUE | DETERMINATION |
|---|---|---|---|---|---|
| 10:00:00 | md0 | (md0) +10 | (md0) -5 | data0 | OK |
| 10:00:01 | md1 | (md1) +10 | (md1) -5 | data1 | OK |
| 10:00:02 | md2 | (md2) +10 | (md2) -5 | data2 | OK |
| 10:00:03 | md3 | (md3) +10 | (md3) -5 | data3 | OK |
| 10:00:04 | md4 | (md4) +10 | (md4) -5 | data4 | OK |
| 10:00:05 | md5 | (md5) +10 | (md5) -5 | data5 | OK |
| 10:00:06 | md6 | (md6) +10 | (md6) -5 | data6 | OK |
| 10:00:07 | md7 | (md7) +10 | (md7) -5 | data7 | OK |
| 10:00:08 | md8 | (md8) +10 | (md8) -5 | data8 | NG |
| 10:00:09 | md9 | (md9) +10 | (md9) -5 | data9 | OK |
| 10:00:10 | md10 | (md10) +10 | (md10) -5 | data10 | OK |
| 10:00:11 | md11 | (md11) +10 | (md11) -5 | data11 | OK |
| 10:00:12 | md12 | (md12) +10 | (md12) -5 | data12 | OK |
| 10:00:13 | md13 | (md13) +10 | (md13) -5 | data13 | OK |
| 10:00:14 | md14 | (md14) +10 | (md14) -5 | data14 | OK |
| 10:00:15 | md15 | (md15) +10 | (md15) -5 | data15 | OK |
| 10:00:16 | md16 | (md16) +10 | (md16) -5 | data16 | OK |
| 10:00:17 | md17 | (md17) +10 | (md17) -5 | data17 | OK |
| 10:00:18 | md18 | (md18) +10 | (md18) -5 | data18 | OK |
| 10:00:19 | md19 | (md19) +10 | (md19) -5 | data19 | OK |
| 10:00:20 | md20 | (md20) +10 | (md20) -5 | data20 | OK |
| 10:00:21 | md21 | (md21) +10 | (md21) -5 | data21 | OK |
| 10:00:22 | md22 | (md22) +10 | (md22) -5 | data22 | OK |
| 10:00:23 | md23 | (md23) +10 | (md23) -5 | data23 | OK |
| 10:00:24 | md24 | (md24) +10 | (md24) -5 | data24 | OK |
| 10:00:25 | md25 | (md25) +10 | (md25) -5 | data25 | OK |
| 10:00:26 | md26 | (md26) +10 | (md26) -5 | data26 | OK |
| 10:00:27 | md27 | (md27) +10 | (md27) -5 | data27 | OK |
| 10:00:28 | md28 | (md28) +10 | (md28) -5 | data28 | OK |
| 10:00:29 | md29 | (md29) +10 | (md29) -5 | data29 | OK |
| 10:00:30 | md30 | (md30) +10 | (md30) -5 | data30 | OK |

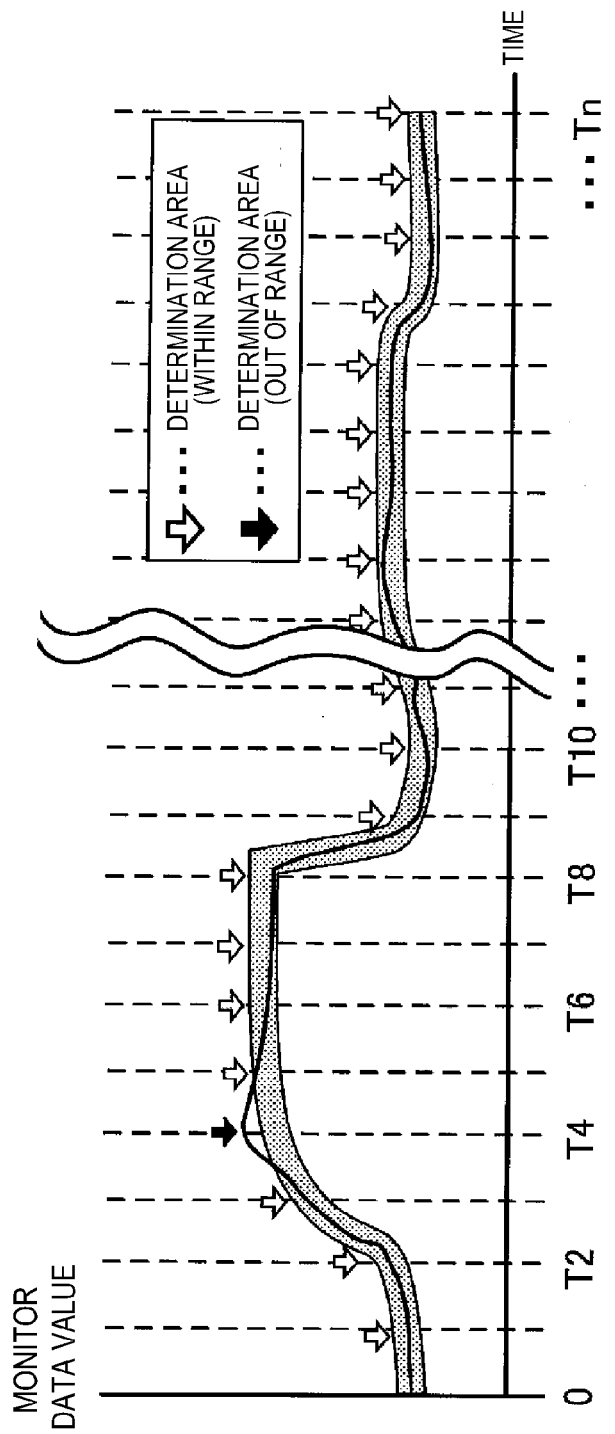

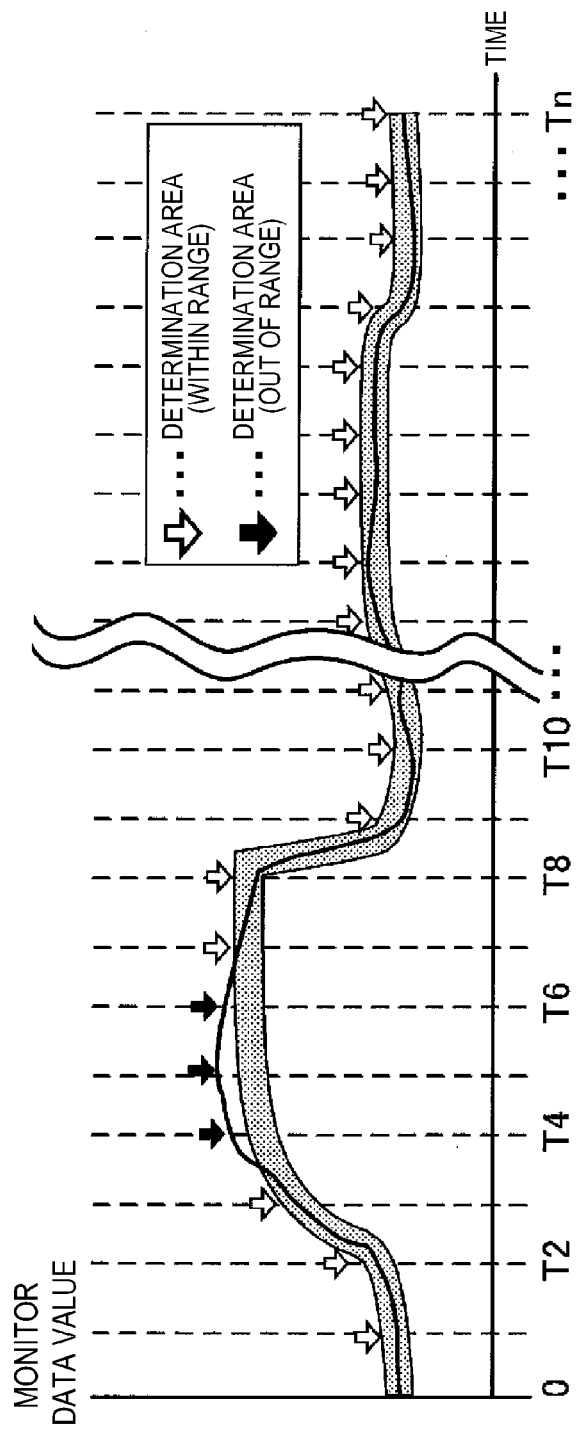

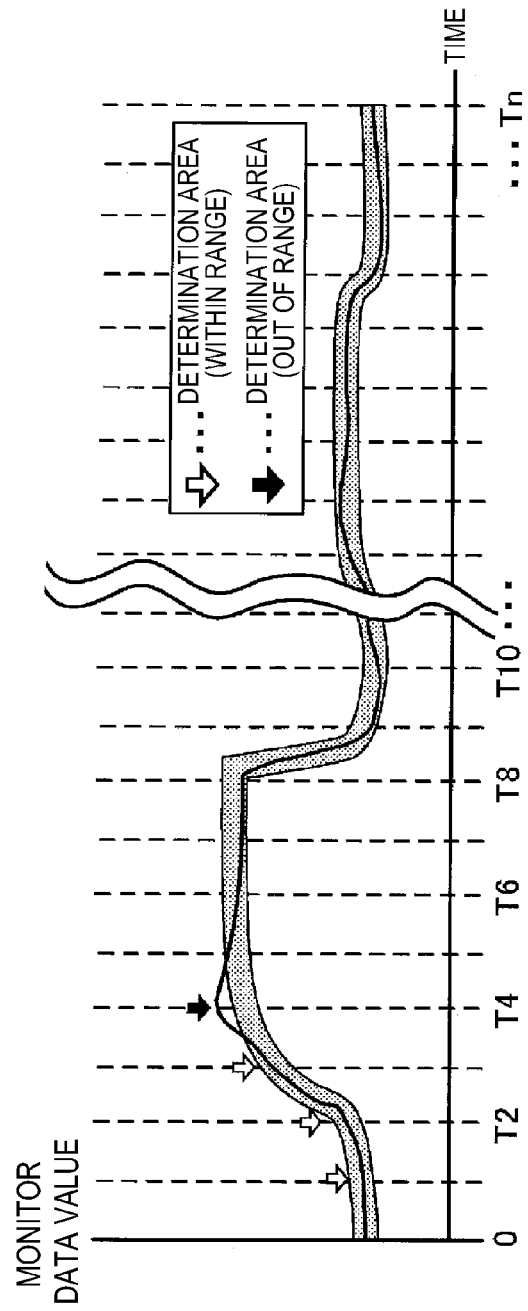

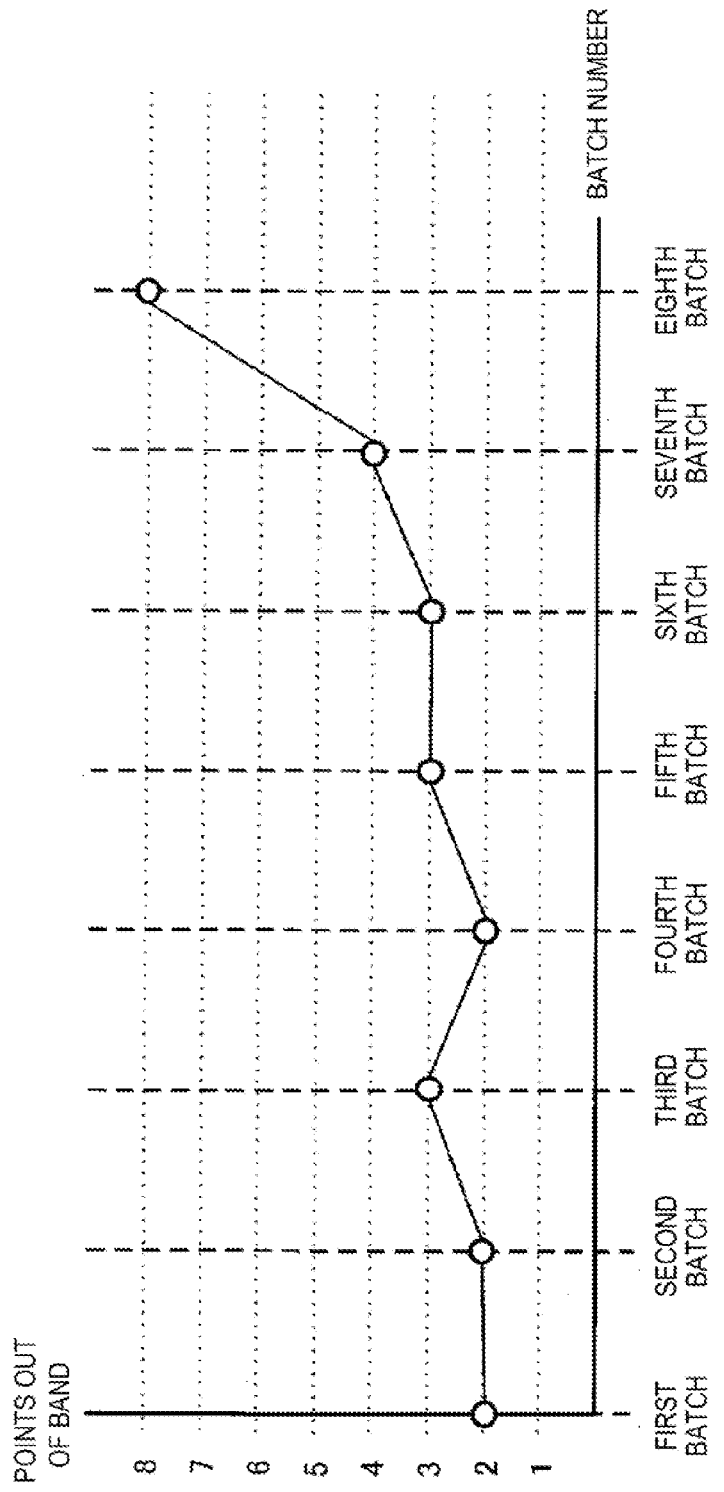

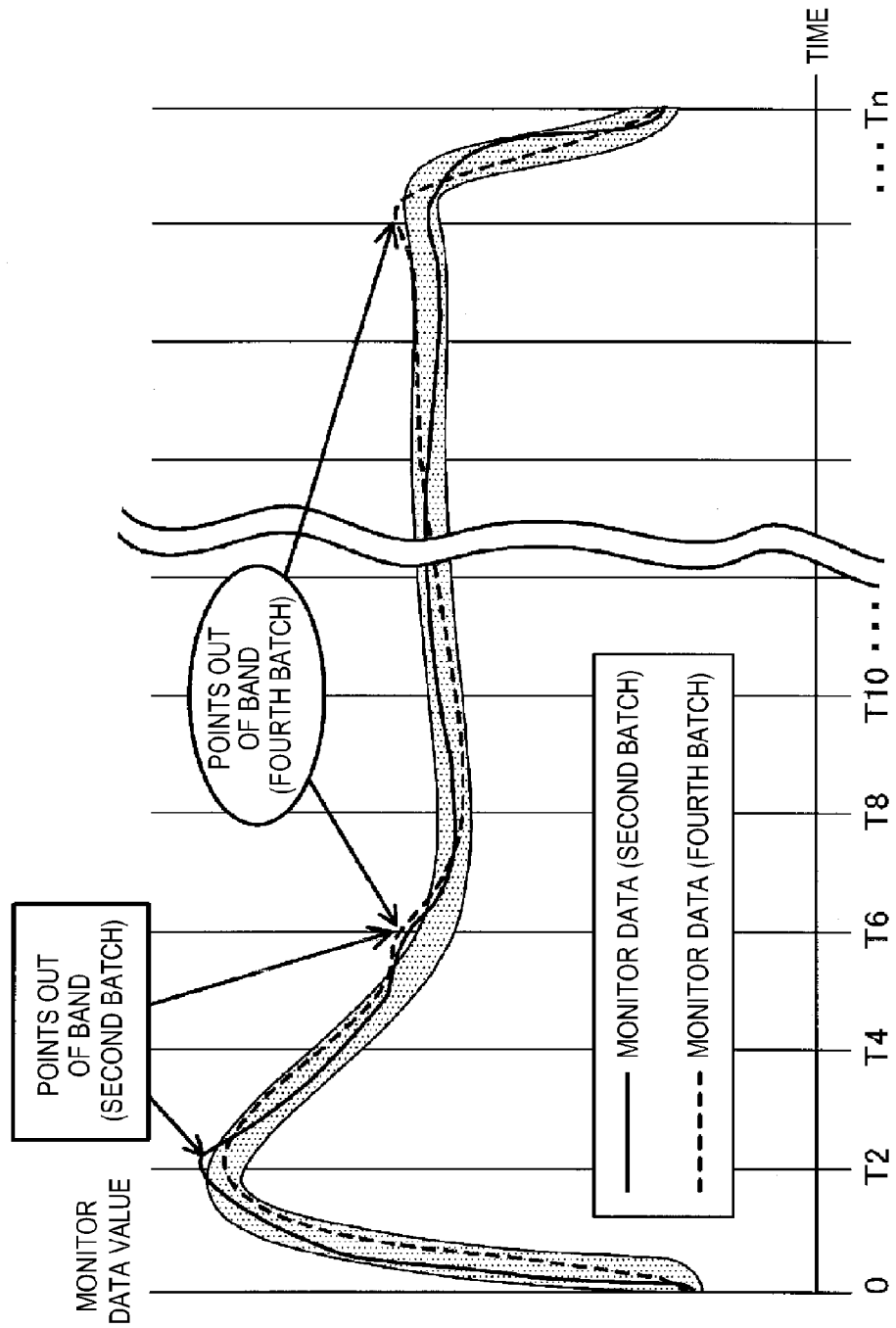

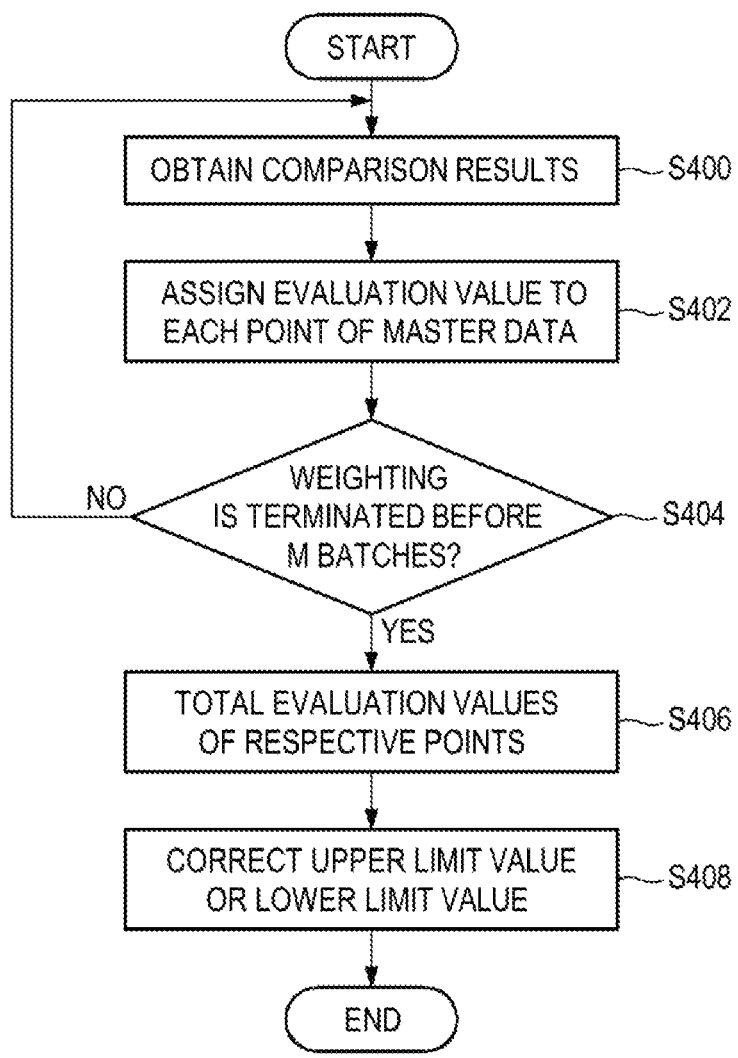

APPARATUS, METHOD, AND COMPUTER-READABLE MEDIUM FOR MANAGING ABNORMALITY DATA MEASURED IN THE SUBSTRATE MANUFACTURING PROCESS

CROSS-REFERENCE TO RELATED APPLICATION(S)

This application is based upon and claims the benefit of priority from Japanese Patent Application No. 2011-81467, filed on Apr. 1, 2011, the entire contents of which are incorporated herein by reference.

TECHNICAL FIELD

The present disclosure relates to a management device for managing processing performed by a substrate processing apparatus.

BACKGROUND

In the field of semiconductor manufacturing, semiconductor production efficiency can be enhanced using a group management system capable of monitoring production history or an operation state of a semiconductor manufacturing apparatus. Also, fault detection and classification (FDC) is executed based on stored monitor data (measurement data regarding the operation state of the semiconductor manufacturing apparatus) to determine whether the apparatus is operating in a normal condition. Any abnormality is identified using alarms to prevent defective manufacturing.

Conventionally, FDC has been executed to determine whether monitor data or statistics, which is the average values of the monitor data, fall within a certain range. Also, if the monitor data or the statistics is out of range, it is determined that an abnormality occurs in the apparatus.

One example of FDC methods includes monitoring waveforms reproduced based on the monitor data (measurement data) and determining if any abnormality occurs. In this method, a currently reproduced waveform is compared with a normal waveform that has been previously obtained and determined to have a certain range (band). Further, if any points in the currently reproduced waveform is found to be out of the range, this waveform is determined to have an abnormality (hereinafter, this method will be referred to as band management')

SUMMARY

The related art band management is performed in such a simple manner that there is only a determination of whether the monitor data falls within the band. When any one portion on the monitor data is determined to be abnormal because it is out of the band, the monitor data is determined to be abnormal. Meanwhile, in a semiconductor manufacturing apparatus, if a portion of the monitor data, which does not affect the production, is out of the band, such portion should not be considered abnormal. However, the related art band management lacks such ability of making an adjustment. Thus, the band management based only on the size of the bandwidth potentially leads to a degradation of abnormality detection performance.

As a result, in the band management, temporary noise, overshoot or the like may be determined to be an abnormality, potentially leading to erroneous reporting. On the other hand, if adjustment is made only to the width of the band, the precision of detecting an abnormality may be degraded. Thus, it is difficult to execute detection of abnormality by the related art band management method, with respect to a waveform having a significant amount of noise or overshoot.

The present disclosure provides some embodiments of a management device capable of precisely managing data through monitoring data waveforms, rather than determining an abnormality of a substrate processing apparatus based on a detection of temporary noise or overshoot.

According to one embodiment of the present disclosure, there is provided a management device comprising: a measurement data storage unit configured to store measurement data transmitted from a substrate processing apparatus for processing a substrate; a setting unit configured to set an item of the measurement data on an operating state of the substrate processing apparatus as a determination target among the measurement data stored in the measurement data storage unit, in a predetermined measurement range, reference data as a determination reference of the measurement data corresponding to the item, and upper and lower limit values with respect to the reference data; a counting unit configured to count the number of times that the value of the measurement data corresponding to the item set by the setting unit exceeds the upper and lower limit values with respect to the reference data set by the setting unit; and a determining unit configured to determine whether the measurement data as the determination target is abnormal, when the counted number counted by the counting unit exceeds a predetermined value.

In another embodiment, there is provided a substrate processing system including a substrate processing apparatus connected to the aforementioned management device.

In yet another embodiment, method of data analyzing data of a substrate processing apparatus, the method comprising: storing measurement data transmitted from the substrate processing apparatus for processing a substrate; setting an item of the measurement data in a predetermined measurement range, reference data as a determination reference of the measurement data corresponding to the item, and upper and lower limit values with respect to the reference data; counting the number of times that the value of the measurement data corresponding to the item exceeds the upper and lower limit values with respect to the reference data; and determining that the measurement data is abnormal, when the counted number exceeds a predetermined value.

BRIEF DESCRIPTION OF THE DRAWINGS

FIG. 7 is a table showing an example of bands generated by the band generation unit.

FIG. 8 is a table showing the comparison results stored in a database by an FDC monitoring unit.

FIGS. 9A and 9B are graphs explaining monitoring by the FDC monitoring unit, wherein FIG. 9A is a graph showing a case in which the number of times the monitor data is out of band is one, and FIG. 9B is a graph showing a case in which the number of times the monitor data is out of band is three.

FIG. 11 is a graph explaining monitoring by Comparative Example.

FIG. 12A is a graph showing an example of the number of points out of band at every batch indicated by a count display unit, and FIG. 12B is a graph showing an example of the count display unit displaying when points are out of band as designated in the graph shown in FIG. 12A.

FIG. 18 is a flow chart illustrating a correction of a bandwidth by a correction unit.

DETAILED DESCRIPTION

A first embodiment of the present disclosure will now be described.

(1) Configuration of Substrate Processing Apparatus

Figure 1:
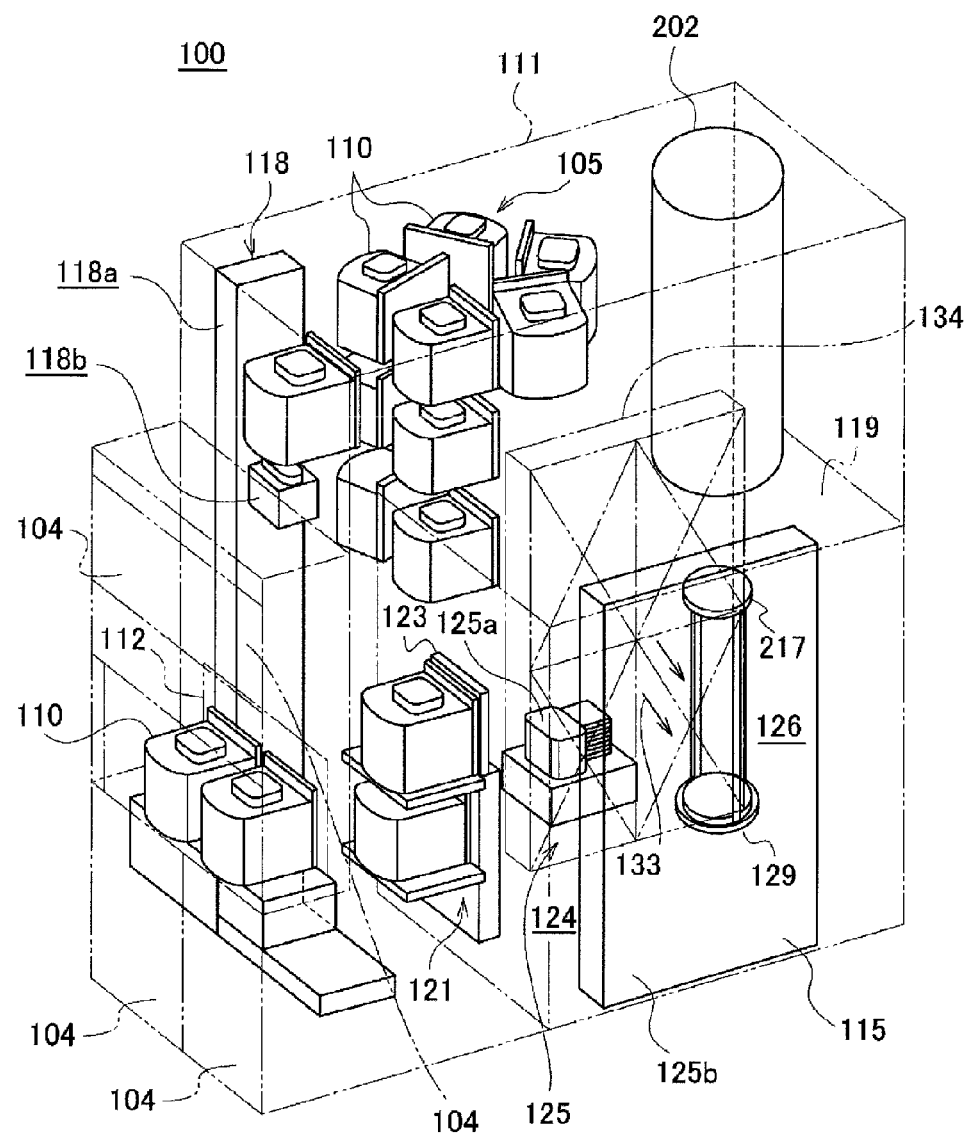
FIG. 1 is a perspective view of a substrate processing apparatus according to a first embodiment of the present disclosure.
Figure 2:
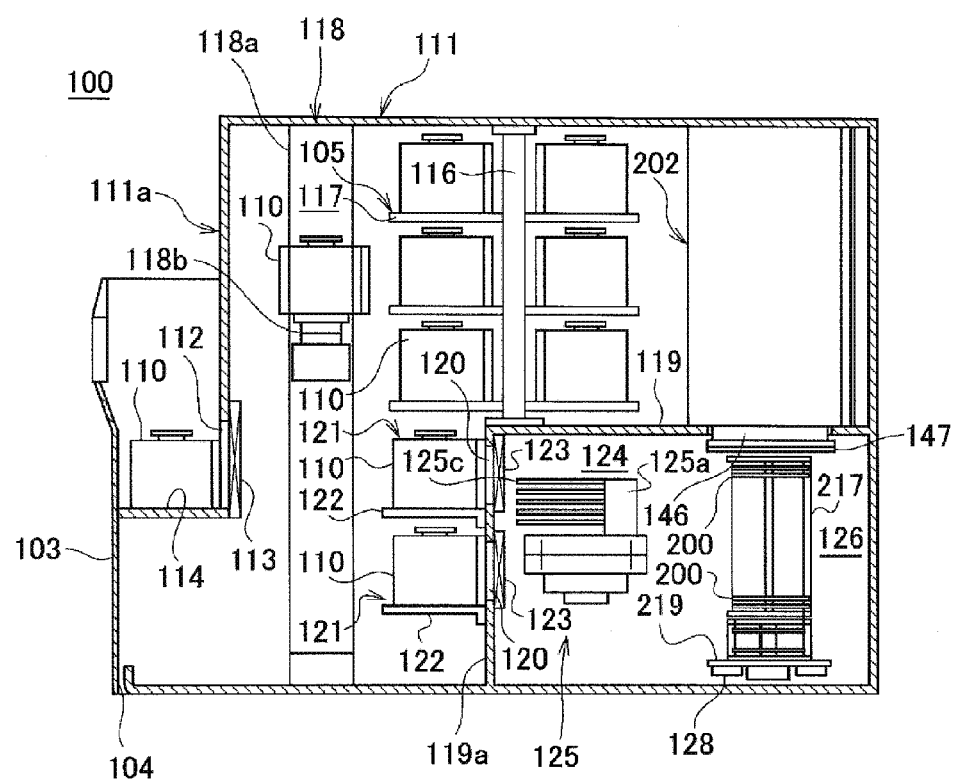
FIG. 2 is a side sectional view of the substrate processing apparatus according to the first embodiment of the present disclosure.

The configuration of a substrate processing apparatus 100 according to the present embodiment will be described with reference to FIGS. 1 and 2. FIG. 1 is a perspective view of the substrate processing apparatus 100 according to the present embodiment, and FIG. 2 is a side sectional view of the substrate processing apparatus 100 according to the present embodiment. The substrate processing apparatus 100 according to the present embodiment is configured as a vertical type device for executing film formation, oxidization, diffusion and the like on a substrate such as, for example, a wafer or the like.

As shown in FIGS. 1 and 2, the substrate processing apparatus 100 according to the present embodiment includes a main body 111 configured as a pressure-resistant container. A front maintenance entrance 103 is provided as an opening allowing for maintenance at a front side of a front wall 111a of the main body 111. A front maintenance door 104 is provided at the front maintenance entrance 103 to open and close the front maintenance entrance 103.

In order to carry a wafer 200 as a substrate made of silicon (Si) or the like into or out of the main body 111, a pod 110 is used as a wafer carrier (substrate container) for receiving a plurality of wafers 200. A pod loading/unloading port (a substrate container loading/unloading port) 112 is formed to communicate with the interior and exterior of the main body 111 at the front wall 111a of the main body 111. The pod loading/unloading port 112 is opened and closed by a front shutter (substrate container loading/unloading port opening/closing mechanism) 113. A rod port (a delivery stage for transmitting and receiving the substrate container) 114 is provided at a front lower side of the pod loading/unloading port 112. The pod 110 is configured to be carried by a conveyance device (not shown) and mounted on the rod port 114 to be aligned thereon.

A pod conveyance device (substrate container conveyance device) 118 is provided in the vicinity of the rod port 114 within the main body 111. A rotary pod shelf (substrate container mounting shelf) 105 is provided at a further inner side of the pod conveyance device 118 within the main body 111, i.e., at an upper side of a substantially central portion in a horizontal direction within the main body 111. A pair of pod openers (substrate container lid opening and closing mechanism) 121 are arranged below the rotary pod shelf 105.

The pod conveyance device 118 includes a pod elevator (substrate container elevating mechanism) 118a that can ascend and descend with the pod 110 hold therein, and a pod conveyance mechanism (substrate container conveyance mechanism) 118b as a conveyance mechanism. The pod conveyance device 118 is configured to carry the pod 110 between the rod port 114, the rotary pod shelf 105, and the pod openers 121 by consecutive operations of the pod elevator 118a and the pod conveyance mechanism 118b.

The rotary pod shelf 105 may be configured to hold a plurality of pods 110 thereon. The rotary pod shelf 105 includes a supporting strut 116 vertically arranged to be intermittently rotated in a horizontal plane, and a plurality of shelf boards (substrate container mounting tables) 117 radially supported by the supporting strut 116 at respective positions of upper, middle and lower stages of the supporting strut 116. The plurality of shelf boards 117 are configured to be maintained with a plurality of pods 110 mounted thereon.

A sub-main body 119 is provided extending over a substantially central portion and a rear end portion in the horizontal direction at a lower portion in the main body 111, where the pod opener 121 is disposed. A pair of wafer loading/unloading ports (substrate loading/unloading ports) 120 for carrying the wafer 200 into or out of the sub-main body 119 are provided on a front wall 119a of the sub-main body 119. The pod openers 121 are provided at upper and lower wafer loading/unloading ports 120, respectively.

The respective pod openers 121 include a pair of mounting tables 122 for mounting the pod 110, and a cap attaching/detaching mechanism (lid member attaching/detaching mechanism) 123 for detachably attaching a cap (lid member) of the pod 110. The pod openers 121 are configured to open and close a wafer charging/discharging port of the pod 110 by detaching and attaching the cap of the pod 110 mounted on the mounting table 122 by the cap attaching/detaching mechanism 123.

In the sub-main body 119, a transfer chamber 124 is configured to be fluidically isolated from a space in which the pod conveyance device 118, the rotary pod shelf 105, and the like are provided. A wafer transfer mechanism (substrate transfer mechanism) 125 is provided at a front area of the transfer chamber 124. The wafer transfer mechanism 125 includes a wafer transfer device (substrate transfer device) 125a for rotating or directly moving the wafer 200 in a horizontal direction, and a wafer transfer device elevator (substrate transfer device elevating mechanism) 125b for lifting or lowering the wafer transfer device 125a. As shown in FIG. 1, the wafer transfer device elevator 125b is provided between a right end portion of a front area of the transfer chamber 124 of the sub-main body 119 and a right end portion of the main body 111. The wafer transfer device 125a includes a tweezer (substrate holder) 125c as a mounting member of the wafer 200. A notch alignment device (not shown) as a substrate alignment device for aligning the position of the wafer 200 in a circumferential direction is provided at the opposite side of the wafer transfer device elevator 125b with the wafer transfer device 125a interposed therebetween. The wafer 200 is configured to be loaded/unloaded (charged/discharged) into/from a boat 217 (to be described later) by consecutive operations of the wafer transfer device elevator 125b and the wafer transfer device 125a.

A standby region 126 for accommodating the boat 217 and making it standby is formed at a rear area of the transfer chamber 124. A processing furnace 202 for processing the wafer 200 is provided above the standby region 126. A lower end portion of the processing furnace 202 is configured to be opened and closed by a furnace port shutter (furnace port opening and closing mechanism) 147. Meanwhile, the configuration of the processing furnace 202 will be described later.

As shown in FIG. 1, a boat elevator (substrate holding member elevating mechanism) 115 for lifting and lowering the boat 217 is provided between a right end portion of the standby region 126 of the sub-main body 119 and a right end portion of the main body 111. An arm 128 as a coupling member is coupled to an elevating platform of the boat elevator 115. A seal cap 219 as a furnace lid member is horizontally provided on the arm 128. The seal cap 219 is configured to vertically support the boat 217 and close a lower end portion of the processing furnace 202.

The boat (substrate holding member) 217 includes a plurality of holding members. The boat 217 is configured to horizontally maintain a plurality of sheets (e.g., about 50 to 125 sheets) of wafers 200, respectively, in a state that the centers of the wafers are aligned in a vertical direction.

As shown in FIG. 1, a clean unit 134 including a dust-proof filter and a supply fan to supply clean air 133, as purified atmosphere or an inert gas, is provided at a left end portion, which is the opposite side of the wafer transfer device elevator 125b of the transfer chamber 124 and the boat elevator 115. The clean air 133 blown from the clean unit 134 is circulated along the periphery of the notch alignment device, the wafer transfer device 125a, and the boat 217 disposed in the standby region 126, and is then sucked by a duct (not shown) so as to be exhausted to the outside of the main body 111 or circulated up to a primary side (supply side), which is a suction side of the clean unit 134, and again blown into the transfer chamber 124.

(2) Operation of Substrate Processing Apparatus

Next, the operation of the substrate processing apparatus 100 according to the present embodiment will be described with reference to FIGS. 1 and 2. The following operations are executed based on, for example, a conveyance recipe. The conveyance recipe is used to carry the wafer 200 within the substrate processing apparatus 100 and is applied to a substrate processing procedure, for example, together with a process recipe for executing substrate processing.

As shown in FIGS. 1 and 2, when the pod 110 is mounted on the rod port 114, the pod loading/unloading port 112 is opened by the front shutter 113. The pod 110 on the rod port 114 is loaded into the main body 111 by the pod conveyance device 118 through the pod loading/unloading port 112.

The pod 110 loaded into the main body 111 is automatically carried onto the shelf board 117 of the rotary pod shelf 105 by the pod conveyance device 118 to be temporarily held thereon. The pod 110 is then transferred onto the mounting table 122 of one pod opener 121 on the shelf board 117. The pod 110 loaded into the main body 111 may be transferred onto the mounting table 122 of the pod opener 121 directly by the pod conveyance device 118. The wafer loading/unloading port 120 of the pod opener 121 is closed by the cap attaching/detaching mechanism 123, and the clean air 133 circulates within the transfer chamber 124 to fill the transfer chamber 124. For example, the interior of the transfer chamber 124 is filled with the clean air 133 such as an inert gas or the like, making oxygen concentration within the transfer chamber 124, for example, 20 ppm or lower, which is significantly lower than the oxygen concentration within the main body 111 which is kept under atmospheric oxygen concentrations.

As for the pod 110 mounted on the mounting table 122, if an end surface of the pod 110 is pressed against an edge portion of the wafer loading/unloading port 120 provided on the front wall 119a of the sub-main body 119, the cap of the pod 110 is detached by the cap attaching/detaching mechanism 123 to open the wafer charging/discharging port. Thereafter, the wafer 200 is picked up from the interior of the pod 110 through the wafer charging/discharging port by the tweezer 125c of the wafer transfer device 125a and position-aligned in a circumferential direction by the notch alignment device, loaded into the standby region 126 behind the transfer chamber 124, and is loaded (charged) into the boat 217. After loading the wafer 200 into the boat 217, the wafer transfer device 125a is returned to the pod 110 and loads a next wafer 200 into the boat 217.

While the wafer 200 is being loaded into the boat 217 from one (upper or lower) pod opener 121 by the wafer transfer mechanism 125, another pod 110 is transferred by the pod conveyance device 118 from the upper portion of the rotary pod shelf 105 onto the mounting table 122 of the other (lower or upper) pod opener 121, so that an opening operation of the pod 110 is executed by the pod opener 121 simultaneously along with the loading operation of the wafer 200.

When a predetermined number of sheets of wafers 200 are loaded into the boat 217, the lower end portion of the processing furnace 202 which has been closed by the furnace port shutter 147 is opened. Subsequently, as the seal cap 219 is lifted by the boat elevator 115, the boat 217 holding a group of the wafers 200 therein is transferred (loaded) into the processing furnace 202.

After loading, predetermined processing is performed on the wafers 200 within the processing furnace 202. After the processing, the boat 217 holding the processed wafers 200 is unloaded from the processing furnace 202, and the pod 110 holding the processed wafer 200 is unloaded from the main body 111 in a sequence substantially reverse to the above-described operations, except for the position-alignment of the wafer by the notch alignment device.

(3) Configuration of Processing Furnace

Figure 3:
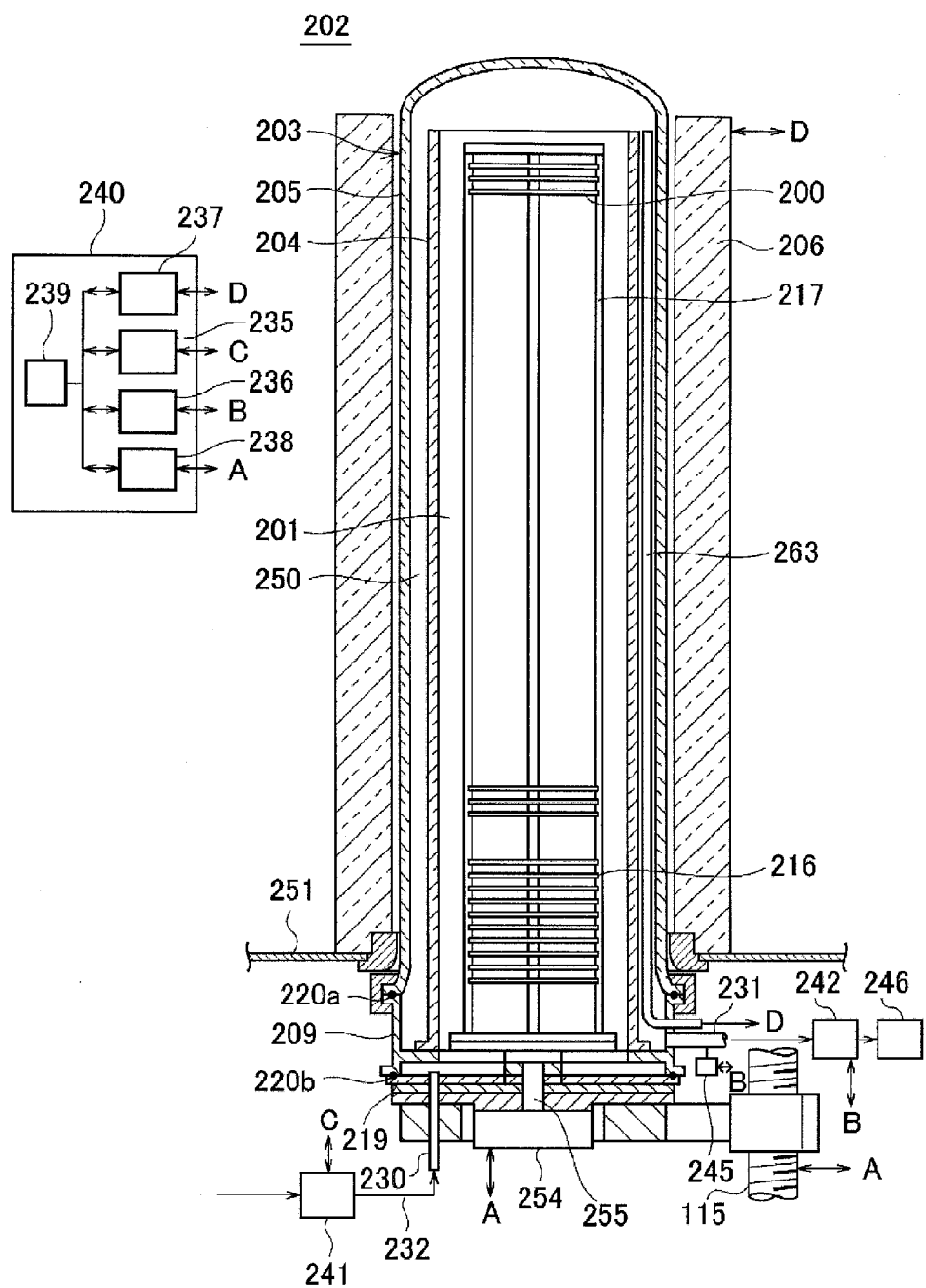
FIG. 3 is a vertical sectional view of a processing furnace of the substrate processing apparatus according to the first embodiment of the present disclosure.

The configuration of the processing furnace 202 according to the present embodiment will now be described with reference to FIG. 3. FIG. 3 is a vertical sectional view of the processing furnace 202 of the substrate processing apparatus 100 according to the present embodiment.

As shown in FIG. 3, the processing furnace 202 includes a process tube 203 as a reaction tube. The process tube 203 includes an inner tube 204 as an inner reaction tube and an outer tube 205 as an outer reaction tube provided at an outer side of the inner tube 204. The inner tube 204 is made of a heat-resistant material such as quartz ($SiO_2$), silicon carbide (SiC) or the like, and has a cylindrical shape with upper and lower ends opened. A processing chamber 201 for processing the wafer 200 as a substrate is formed in a cylindrical hollow portion within the inner tube 204. The interior of the processing chamber 201 is configured to accommodate the boat 217 to be described later. The outer tube 205 has a cross sectional shape of a concentric circle with the inner tube 204. The outer tube 204 has an inner diameter greater than an outer diameter of the inner tube 204 and has a cylindrical shape with an upper end sealed and a lower end opened. The outer tube 205 is made of a heat-resistant material such as, for example, quartz, silicon carbide, or the like.

A heater 206 is provided as a heating mechanism to surround a side wall surface of the process tube 203 at an outer side thereof. The heater 206 has a cylindrical shape and is supported by a heater base 251 as a holding plate so as to be vertically arranged.

A temperature sensor 263 as a temperature detector is provided within the process tube 203. A temperature controller 237 is electrically connected to the heater 206 and the temperature sensor 263. The temperature controller 237 is configured to adjust a current supplied to the heater 206 based on temperature information detected by the temperature sensor 263 such that the temperature within the processing chamber 201 has a desired temperature distribution at a desired timing.

A manifold 209 is provided at a lower side of the outer tube 205 to have a cross sectional shape of a concentric circle with the outer tube 205. The manifold 209 is made of, for example, stainless steel or the like, and has a cylindrical shape with upper and lower ends thereof opened. The manifold 209 is coupled to a lower end portion of the inner tube 204 and a lower end portion of the outer tube 205 to support them. Further, an O-ring 220a as a seal member is provided between the manifold 209 and the outer tube 205. The manifold 209 is supported by the heater base 251, such that the process tube 203 is vertically arranged. A reaction container is formed by the process tube 203 and the manifold 209.

The seal cap 219 as a furnace port lid member, which can air-tightly close the opening of the lower end of the manifold 209, is provided at a lower side of the manifold 209. The seal cap 219 comes into contact with the lower end of the manifold 209 from a lower side in a vertical direction. The seal cap 219 is made of a metal such as, for example, stainless steel or the like, and has a disk-like shape. An O-ring 220b as a seal member that is in contact with the lower end of the manifold 209 is provided on an upper surface of the seal cap 219. The seal cap 219 is configured to be lifted and lowered in a vertical direction by the boat elevator 115 as a substrate holding member elevating mechanism vertically provided at an outer side of the process tube 203. The boat 217 can be carried into or out of the processing chamber 201 by lifting or lowering the seal cap 219.

A rotating mechanism 254 for rotating the boat 217 is provided in the vicinity of a central portion of the seal cap 219 at the opposite side of the processing chamber 201. A rotational shaft 255 of the rotating mechanism 254 penetrates the seal cap 219 and supports the boat 217 from a lower side. The rotating mechanism 254 is configured to rotate the boat 217 and thus rotate the wafer 200.

A conveyance controller 238 is electrically connected to the boat elevator 115 and the rotating mechanism 254. The conveyance controller 238 is configured to control the rotating mechanism 254 and the boat elevator 115 such that they perform a desired operation at a desired timing. Additionally, the conveyance controller 238 is also electrically connected to the foregoing pod elevator 118a, the pod conveyance mechanism, the pod opener 121, the wafer transfer device 125a, the wafer transfer device elevator 125b, and the like to control them such that these elements perform a desired operation at a desired timing. Mainly, a conveyance system according to the present embodiment is configured by the boat elevator 115, the rotating mechanism 254, the pod elevator 118a, the pod conveyance mechanism 118b, the pod opener 121, the wafer transfer device 125a, and the wafer transfer device elevator 125b.

The boat 217 as a substrate holding member is configured to hold a plurality of sheets of wafers 200 horizontally stacked in multiple stages with the center of the wafers concentrically aligned. The boat 217 is made of, for example, a heat-resistant material such as quartz, silicon carbide, or the like. A plurality of insulating plates 216 are used as insulating members and have a disk-like shape. The insulating plates 216 are made of, for example, a heat-resistance material such as quartz, silicon carbide, or the like and are disposed to be horizontally stacked in multiple stages at a lower side of the boat 217 in order to restrain heat from the heater 206 from being transferred to the manifold 209.

A nozzle 230 as a gas introduction unit is connected to the seal cap 219 such that it communicates with the interior of the processing chamber 201. A downstream end of a gas supply pipe 232 is connected to an upstream end of the nozzle 230. One or a plurality of gas supply sources (not shown) such as a raw gas, an inert gas or the like, a mass flow controller (MFC) 241 as a gas flow rate controller, and a plurality of valves (not shown) are connected to the gas supply pipe 232 in order from the upstream side. A gas flow rate controller 235 is electrically connected to the MFC 241. The gas flow rate controller 235 is configured to control the MFC 241 such that a flow rate of a gas supplied into the processing chamber 201 has a desired flow rate at a desired timing. Mainly, a gas supply system according to the present embodiment is configured by the nozzle 230, the gas supply pipe 232, a plurality of valves (not shown), the MFC 241, and the gas supply source.

An upstream end of an exhaust pipe 231 for exhausting the atmosphere within the processing chamber 201 is connected to the manifold 209. The exhaust pipe 231 is disposed at a lower end portion of the cylindrical space 250 formed by a gap between the inner tube 204 and the outer tube 205, and communicates with the cylindrical space 250. A pressure sensor 245 as a pressure detector, an auto-pressure controller (APC) 242 as a pressure adjustment device, and a vacuum pump 246 as a vacuum exhaust device are connected at a downstream side of the exhaust pipe 231 in order from an upstream side. The APC 242 is a switching valve which is operable to open and close its valve to perform and stop vacuum exhaust within the processing chamber 201, and additionally adjusts an opening degree of the valve to adjust pressure. A pressure controller 236 is electrically connected to the APC 242 and the pressures sensor 245. The pressure controller 236 is configured to control the APC 242 such that the pressure within the processing chamber 201 has a desired pressure at a desired timing, based on a pressure value detected by the pressure sensor 245. Mainly, a gas exhaust system according to the present embodiment is configured by the exhaust pipe 231, the pressure sensor 245, the APC 242, and the vacuum pump 246.

The gas flow rate controller 235, the pressure controller 236, the temperature controller 237, and the conveyance controller 238 are electrically connected to a display device controller 239 for controlling the substrate processing apparatus 100 (hereinafter, the gas flow rate controller 235, the pressure controller 236, and the temperature controller 237 are also referred to as an I/O controller). The gas flow rate controller 235, the pressure controller 236, the temperature controller 237, the conveyance controller 238, and the display device controller 239 are included in a substrate processing apparatus controller 240. The configuration and operation of the substrate processing apparatus controller 240 will be described later.

(4) Operation of Processing Furnace

A substrate processing procedure employing the processing furnace 202, which is executed as a part of the fabrication process of the semiconductor device, will now be described. The substrate processing procedure is repeatedly executed based on the process recipe for executing a predetermined processing on the wafer 200. Also, the process recipe may include a plurality of steps (processes). In the present embodiment, a film forming process of forming a thin film on the wafer 200 through a chemical vapor deposition (CVD) method will be described as an example of the substrate processing procedure based on the process recipe. Further, in the following description, the operations of respective parts constituting the substrate processing apparatus 100 are controlled by the substrate processing apparatus controller 240.

Substrate Loading Step

First, a substrate loading step is executed. In particular, a plurality of sheets of wafers 200 are charged into the boat 217 (wafer charging), and the boat 217 holding the plurality of sheets of wafers 200 therein is lifted by the boat elevator 115 and loaded into the processing chamber 201 (boat loading). In this state, the seal cap 219 seals the lower end of the manifold 209 with the O-ring 220b interposed therebetween.

Film Forming Process

Subsequently, a film forming process is performed on the wafers 200 by executing respective steps from a decompression step to a normal pressure restoration step. The respective steps from the decompression step to the normal pressure restoration step are included in the process recipe in the present embodiment. Further, the process recipe may include the substrate loading step or a substrate unloading step to be described later.

Decompression Step

First, the processing chamber 201 is vacuum-exhausted by the vacuum pump 246 to have a desired pressure (vacuum degree) in the processing chamber 201. At this time, the opening degree of the valve of the APC 242 is feedback-controlled based on a pressure value measured by the pressure sensor 245.

Temperature Rising Step

Next, the interior of the processing chamber 201 is heated by the heater 206 to have a desired temperature within the processing chamber 201. At this time, an amount of current supplied to the heater 206 is feedback-controlled based on the temperature value detected by the temperature sensor 263. Subsequently, the boat 217 and the wafers 200 are rotated by the rotating mechanism 254.

Temperature Stabilization Step

Next, in a temperature stabilization step, the temperature within the heated processing chamber 201 is stabilized.

Film Forming Step

When the temperature within the processing chamber 201 is stabilized, a valve (not shown) of the gas supply pipe 232 is opened to supply raw gas into the processing chamber 201 from a gas supply source by controlling a flow rate by the MFC 241. The raw gas flows upward within the processing chamber 201 and is discharged from the upper end opening of the inner tube 204 to the cylindrical space 250 so as to be exhausted from the exhaust pipe 231. When the raw gas passes through the interior of the processing chamber 201, it comes into contact with the surface of the wafer 200 and a thin film is deposited on the surface of the wafer 200 through a thermal CVD reaction. When a preset processing time has lapsed, the supply of raw gas into the processing chamber 201 is stopped.

Temperature Rising Step

When the supply of raw gas is stopped, power supply to the heater 206 is stopped and the temperature of the boat 217 and the wafer 200 are lowered to a certain temperature.

Normal Pressure Restoration Step

An inert gas is supplied from a gas supply source, and the interior of the processing chamber 201 is substituted with the inert gas and, at the same time, the pressure within the processing chamber 201 is returned to have a normal pressure. Accordingly, the film forming process based on the process recipe is terminated.

Substrate Unloading Step

Thereafter, a substrate unloading step is executed. Specifically, the seal cap 219 is lowered by the boat elevator 115 to open the lower end of the manifold 209 and, at the same time, the boat 217 holding the processed wafer 200 therein is unloaded from the lower end of the manifold 209 to an outer side of the process tube 203 (boat unloading). The processed wafer 200 is taken out from the boat 217 and contained in the pod 110 (wafer discharging). Accordingly, the film forming process based on the process recipe is terminated.

(5) Configuration of Substrate Processing Apparatus Controller

Figure 4:
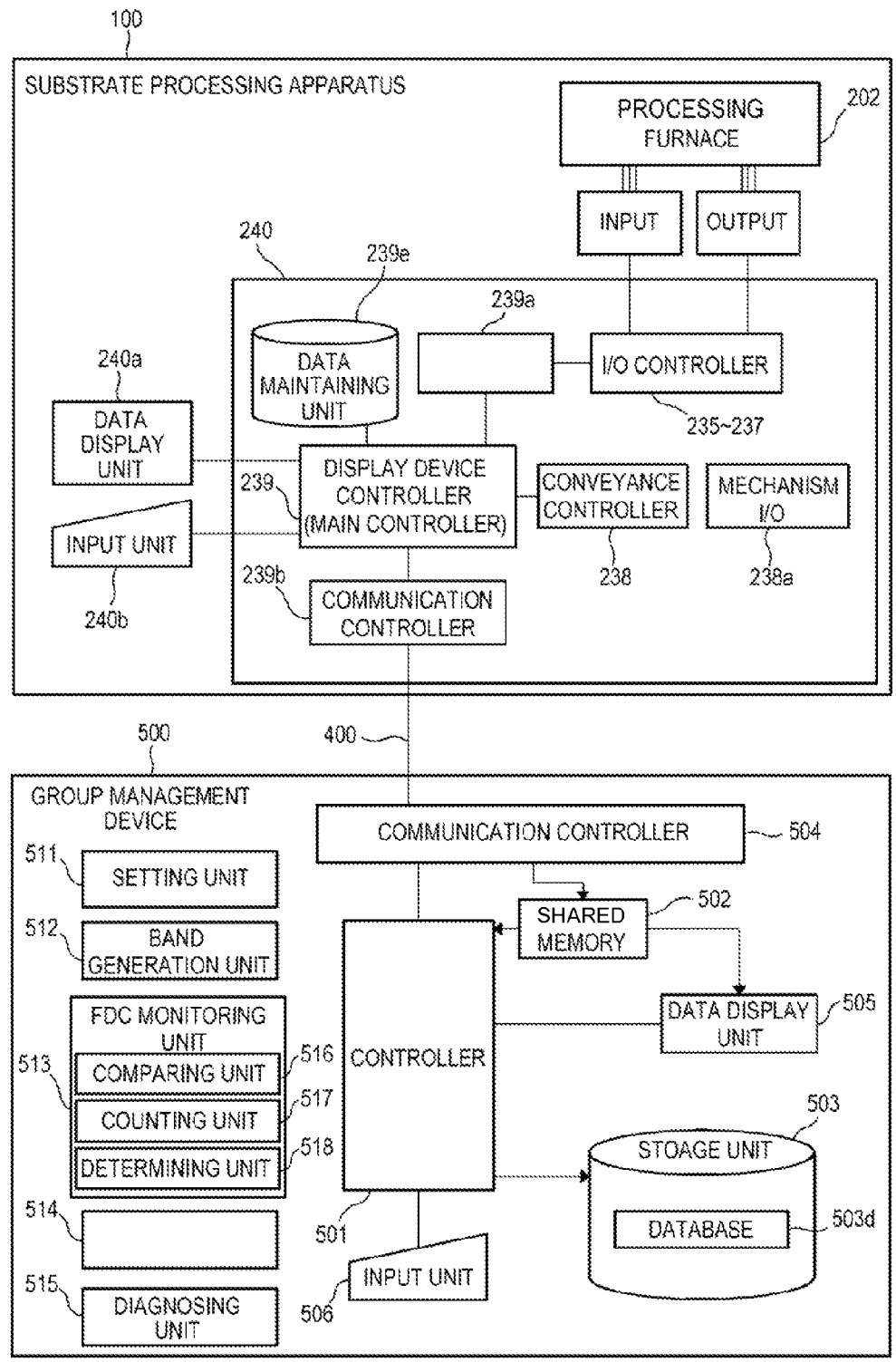
FIG. 4 is a block diagram of a substrate processing system according to the first embodiment of the present disclosure.

The configuration of the substrate processing apparatus controller 240 according to the present embodiment will now be described with reference to FIG. 4. FIG. 4 is a block diagram of a substrate processing system including the substrate processing apparatus 100 and a group management device 500 according to the present embodiment.

The substrate processing apparatus controller 240 includes a display device controller (manipulation unit) 239 as a main controller. A data display unit 240a such as a display or the like, and an input unit 240b such as a keyboard or the like are connected to the display device controller 239. The display device controller 239 is configured to receive an input (input of a manipulation command or the like) from the input unit 240b, which is manipulated by an operator, and to display a state display screen of the substrate processing apparatus 100, a manipulation input reception screen or the like on the data display unit 240a.

The substrate processing apparatus controller 240 includes a processing controller 239a connected to the display device controller 239 such that data can be exchanged therebetween. Also, the foregoing I/O controller components (the gas flow rate controller 235, the pressure controller 236, and the temperature controller 237) are connected to the processing controller 239a to control the processing furnace 202 such that data can be exchanged therebetween. The processing controller 239a controls the operation of the processing furnace 202 by using the I/O controller interposed therebetween and collect (read) monitor data indicating the state (temperature, gas flow rate, pressure, etc.) of the processing furnace 202. Specifically, the monitor data includes measurement data indicating an operation state of the substrate processing apparatus 100.

Further, the substrate processing apparatus controller 240 includes a conveyance controller 238 connected to the display device controller 239 to exchange data therebetween and a mechanism I/O 238a connected to the conveyance controller 238 to exchange data therebetween. Respective parts (e.g., the boat elevator 115, the rotating mechanism 254, the pod elevator 118a, the pod conveyance mechanism 118b, the pod opener 121, the wafer transfer device 125a, the wafer transfer device elevator 125b, etc.) constituting the substrate processing apparatus 100 are connected to the mechanism I/O 238a. The conveyance controller 238 is configured to control the operations of the respective parts constituting the substrate processing apparatus 100 by using the mechanism I/O 238a interposed therebetween and collect (read) monitor data indicating the states (e.g., positions, switching state, whether the respective parts are operated or in a standby state, etc.) of the respective parts constituting the substrate processing apparatus 100.

Also, the substrate processing apparatus controller 240 includes a data maintaining unit 239e connected to the display device controller 239. The data maintaining unit 239e is configured to maintain (store) programs for realizing various functions on the substrate processing apparatus controller 240, setting data (recipe data) of the substrate processing procedure executed in the processing furnace 202, various data read from the I/O controller (the gas flow rate controller 235, the pressure controller 236, the temperature controller 237) and the conveyance controller 238, or the like.

In addition, the substrate processing apparatus controller 240 includes a communication controller 239b connected to the display device controller 239. The communication controller 239b is configured to receive the monitor data indicating the state (temperature, gas flow rate, pressure, etc.) of the processing furnace 202 read by using the I/O controller (the gas flow rate controller 235, the pressure controller 236, the temperature controller 237) through the processing controller 239a and the display device controller 239, and transmit the received monitor data to the group management device 500. Also, the communication controller 239b is configured to receive monitor data indicating the states (e.g., positions, switching state, whether the respective parts are operated or in a standby state, etc.) of the respective parts constituting the substrate processing apparatus 100 read by using the mechanism I/O 238a through the conveyance controller 238 and the display device controller 239, and transmit the received monitor data to the group management device 500.

(6) Configuration of Group Management Device

The configuration of the group management device 500 according to the present embodiment configured to exchange data with the foregoing substrate processing apparatus 100 will now be described with reference to FIG. 4.

As shown in FIG. 4, the group management device 500 is configured as a computer including a controller 501 configured as a central processing unit (CPU), a memory (not shown) having a shared memory area 502 therein, a storage unit 503 configured as a storage device such as a HDD or the like, a data display unit 505 as a display unit such as a display device or the like, an input unit 506 such as a keyboard or the like, and a communication controller 504 as a communication unit. The foregoing memory, the storage unit 503, the data display unit 505, the input unit 506, and the communication controller 504 are configured to exchange data with the controller 501 using an internal bus or the like interconnecting these units. Also, the controller 501 has a clock function (not shown).

Communication Controller

The communication controller 504 as a communication unit is connected to the communication controller 239b of the substrate processing apparatus controller 240 and also connected to the I/O controller (the gas flow rate controller 235, the pressure controller 236, and the temperature controller 237) and the mechanism I/O 238a through a network 400. The communication controller 504 is configured to receive monitor data from the substrate processing apparatus 100 and transfer the received monitor data to the shared memory 502.

The communication controller 504 is configured to periodically receive monitor data at certain time intervals (e.g., at an interval of 0.1 seconds) as a reception timing of the monitor data, or receive the monitor data when each event occurs, e.g., at a timing when performing the recipe or a step is terminated, or whenever the monitor data is generated.

Further, the communication controller 504 is configured to transmit an "event detection notification" to an FDC monitoring unit 513 when it receives an event corresponding to the monitor data as a monitoring target of the FDC monitoring unit 513 (to be described later) from the substrate processing apparatus 100. In addition, the communication controller 504 is configured to transmit an "event termination notification" to the FDC monitoring unit 513 when it receives a termination of an event corresponding to the monitor data as a monitoring target of the FDC monitoring unit 513 (to be described later) from the substrate processing apparatus 100.

The monitor data transferred to the shared memory 502 is configured to be associated with a data ID identifying the monitor data, device-specific information (a device name or the like) specifying the substrate processing apparatus 100 as a generation source of the monitor data, recipe-specific information specifying a recipe which has been executed by the substrate processing apparatus 100 when the monitor data is generated, event-specific information specifying an event generated within the substrate processing apparatus 100 when the monitor data is collected, and time information (time data) indicating a time at which the monitor data is generated.

Storage Unit

The storage unit 503 stores a database program, a setting program, a band generation program, an FDC monitoring program, a count indication program, and a diagnosis program.

The database program is read from the storage unit 503 and stored in the memory as described in relation to FIG. 4 (not shown), and executed in the controller 501, so as to realize a database 503d (to be described later) in the storage unit 503.

The setting program is read from the storage unit 503 and stored in the memory as described in relation to FIG. 4 (not shown), and executed in the controller 501, so as to realize a setting unit 511 (to be described later) in the group management device 500.

The band generation program is read from the storage unit 503 and stored in the memory as described in relation to FIG. 4 (not shown), and executed in the controller 501, so as to realize a band generation unit 512 (to be described later) in the group management device 500.

The FDC monitoring program is read from the storage unit 503 and stored in the memory as described in relation to FIG. 4 (not shown), and executed in the controller 501, so as to realize an FDC monitoring unit 513 (to be described later) in the group management device 500.

The count indication program is read from the storage unit 503 and stored in the memory as described in relation to FIG. 4 (not shown), and executed in the controller 501, so as to realize a count display unit 514 (to be described later) in the group management device 500.

The diagnosis program is read from the storage unit 503 and stored in the memory as described in relation to FIG. 4 (not shown), and executed in the controller 501, so as to realize a diagnosing unit 515 (to be described later) in the group management device 500.

The database 503d as a storing unit is configured to store the monitor data, which has been received by the communication controller 504 and stored in the shared memory 502, such that it is readable in association with each of the foregoing data ID, the device-specific information, the recipe-specific information, the event-specific information, and the time data, when the database program is executed. In addition, the database 503d is configured to store a band (to be described later), comparison results (to be described later), relevant data (to be described later), and error diagnosis rule (to be described later).

Also, the database 503d is configured to store reference data (hereinafter, referred to as "master data"), which is monitor data obtained when substrate processing is normally performed. When a selection of a master data file is requested from the input unit 506, the database 503d extracts the master data corresponding to the master data file, and stores the same.

The master data is obtained and extracted for a predetermined interval. Such interval is, for example, related to the occurrence of a certain event within the substrate processing apparatus 100. As used herein, an event refers to a phenomenon occurring within the substrate processing apparatus 100, an operation of each part of the substrate processing apparatus 100, or the like. For example, the event may include one or more events occurring in time series order according to execution of a recipe such as a switching operation of a valve, an ON/OFF operation of a sensor, generation of an abnormality, various manipulations by an operator or the like, in addition to an initiation and termination of performing a recipe or a step or the like, and any other event which is not necessarily based on the execution of a recipe.

As an example extraction condition for associating an interval for extracting master data with an occurrence of a certain event, the monitor data may be extracted during a period between certain events. The period between certain events may be, for example, a period from an initiation of execution of a certain recipe or a step to a termination of the execution, a period from an initiation of loading the wafer 200 to a termination of unloading the wafer 200, in particular, a period from the initiation of charging the wafer 200 into the boat 217 in the foregoing substrate loading step to a period of termination of discharging the wafer 200 from the boat 217 in the substrate unloading step, and the like. An extraction condition may be set to extract monitor data within a certain period according to the occurrence of a certain event (e.g., monitor data is extracted for 10 seconds starting from the opening of the valve), periodically extract monitor data starting from an occurrence of a certain event (e.g., monitor data is extracted at every 10 minutes starting from an initiation of electrical connection of the heater 206), extract monitor data during an interval from an occurrence of a certain event until a certain number of monitor data is obtained, or extract monitor data during an interval until the monitor data becomes a certain value. Also, a plurality of steps including any combination of the above conditions may be set as the extraction condition.

Hereinafter, a program executed by the controller 501 will be described. The setting unit 511, the band generation unit 512, the FDC monitoring unit 513, the count display unit 514, and the diagnosing unit 515 are implemented using the program executed by the controller 501 as well as the foregoing database program. Also, the FDC monitoring unit 513 includes a comparing unit 516, a counting unit 517, and a determining unit 518.

The setting unit 511 sets a band management designated by an input (an input of a manipulation command or the like) from the input unit 506 with respect to the band generation unit 512, the FDC monitoring unit 513, and the diagnosing unit 515 to be described later.

The band generation unit 512 generates a band used for the band management based on the master data set by the setting unit 511, and an upper limit designation value and a lower limit designation value. As used herein, the band refers to a range determined by setting a bandwidth for a waveform representing the master data. More specifically, the band refers to a range determined by designating an upper limit value and a lower limit value for the values of respective data points constituting the master data.

The FDC monitoring unit 513 compares the band generated by the band generation unit 512 and the monitor data, and when the monitor data is out of the band for more than a predetermined number of times, the FDC monitoring unit 513 determines that the monitor data is abnormal. Also, the FDC monitoring unit 513 is configured to display the detecting of an abnormality, for example, on the data display unit 505 when the monitor data is determined to be abnormal.

The FDC monitoring unit 513 counts deviated points (to be described later) out of the band, and the count display unit 514 displays the number of the deviated points for every batch processing on the data display unit 505.

The diagnosing unit 515 executes diagnosing of statistics including the number of the deviated points by using an abnormality diagnosing rule to be described later. Also, when the diagnosis of the statistic indicates that an abnormality is found, for example, the diagnosing unit 515 is configured to display the detection of an abnormality on the data display unit 505.

In addition, in the present embodiment, the setting unit 511, the band generation unit 512, the FDC monitoring unit 513, the count display unit 514, and the diagnosing unit 515 are configured to be realized by the controller 501 within the management device 500, but these elements may also be configured to be realized by the main controller 239 of the substrate processing apparatus 100. However, when the main controller 239 executes the database program, the setting program, the band generation program, the FDC monitoring program, the count indication program, and the diagnosing program to realize the setting unit 511, the band generation unit 512, the FDC monitoring unit 513, the count display unit 514, and the diagnosing unit 515, a storage unit such as a database or the like may be prepared for handling a huge amount of data. Also, while the substrate processing apparatus 100 is being actuated or certain processing (film forming or the like) is executed on the substrate (wafer, etc.), the programs may not be executed.

Hereinafter, each of the setting unit 511, the band generation unit 512, the FDC monitoring unit 513, the count display unit 514, and the diagnosing unit 515 will be described.

Setting Unit

The setting unit 511 generates a setting screen on the data display unit 505 and performs a setting designated by an input from the input unit 506 with respect to the band generation unit 512, the FDC monitoring unit 513, and the diagnosing unit 515.

Figure 5:
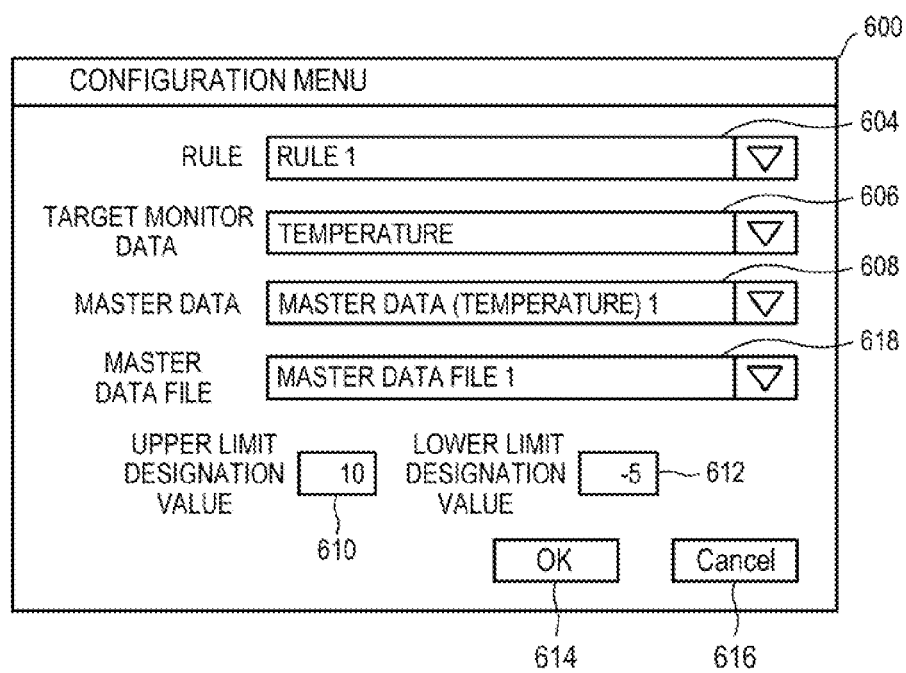
FIG. 5 is a plane view showing an example of a setting screen configured by a setting unit 511.

FIG. 5 shows an example of the setting screen generated by the setting unit 511. The setting screen 600 shown in FIG. 5 includes a selection box 604 for designating which rule (to be described later) is to be executed by the diagnosing unit 515, a selection box 606 for designating an item of monitor data as a monitoring target monitored by the FDC monitoring unit 513, a selection box 608 for designating master data (to be described later) with respect to the monitor data as the monitoring target monitored by the FDC monitoring unit 513, a master data file selection box 618 for designating a file in which the master data are stored in time series, input boxes 610 and 612 for designating an upper limit designation value and a lower limit designation value for generating a band (to be described later), respectively, a button 614 for confirming that a setting is completed, and a button 616 for canceling a setting.

In some embodiments, the setting screen 600 may include any type of input interfaces such as a check box, a selection box, an input box, a button, or the like as long as it can receive setting information.

When an input with respect to the setting screen 600 is executed from the input unit 506, the controller 501 outputs a corresponding setting to the band generation unit 512, the FDC monitoring unit 513, and the diagnosing unit 515.

Band Generation Unit

The band generation unit 512 reads the master data file set by the setting screen 600 from the database 503*d* and adds an upper limit value and a lower limit value with respect to the read master data based on the upper limit and lower limit designation values to generate a band. Also, the band generation unit 512 stores the generated band data in the database 503*d*.

Figure 6:
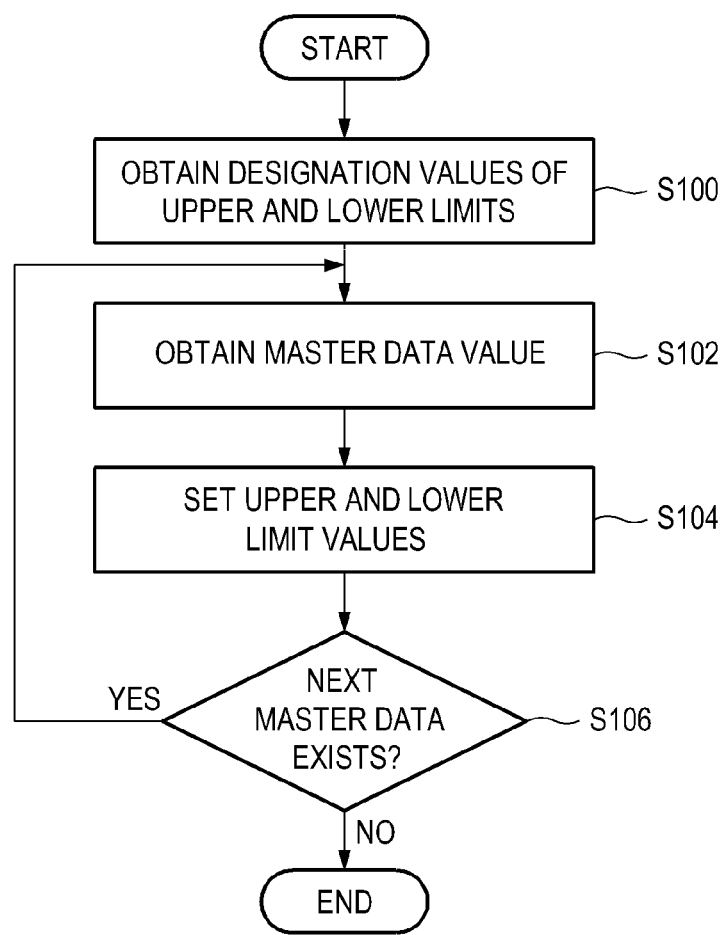
FIG. 6 is a flow chart of a process of generating a band by a band generation unit.

FIG. 6 is a flow chart of a process of generating a band by the band generation unit 512. Further, FIG. 7 is a table showing an example of the band data generated by the band generation unit 512. The example of FIG. 7 shows a case in which "+10" as the upper limit designation value and "−5" as the lower limit designation value are designated for the master data including a stream of data values md0 to md30. For example, an upper limit value of the master data value m0 is md0+10 and a lower limit value thereof is md0−5.

Hereinafter, a flow of a band generation by the band generation unit 512 will be described with reference to FIG. 6.

In step 100 (S100), the band generation unit 512 reads upper limit and lower limit designation values set through the setting screen 600.

In step 102 (S102), the band generation unit 512 reads a master data value from the database 503*d*, with respect to a master data file set through the setting screen 600.

In step 104 (S104), the band generation unit 512 generates an upper limit value and a lower limit value with respect to the master data based on the read master data and the upper limit and lower limit designation values read in step 100. In the present embodiment, the upper limit designation value ("+10" in this embodiment) and the lower limit designation value ("−5" in this embodiment) are added to the master data value, respectively, to generate the upper limit value and the lower limit value.

In step 106 (S106), the band generation unit 512 checks whether a next master data value is available from the database 503*d*, in association with the designated master data, and if a next master data value is available, the process returns to step 102 to continue a subsequent band generation. On the other hand, if no next master data value is available, the band generation processing is terminated.

As shown in FIG. 7, an upper limit value and a lower limit value of each master data value of the master data are generated, and a bandwidth determined by the upper limit value and the lower limit value is set to be a band.

FDC Monitoring Unit

The FDC monitoring unit 513 including the comparing unit 516, the counting unit 517, and the determining unit 518 compares the monitor data set by the setting screen 600 and the band generated with respect to the master data as a determination reference of the monitor data, thus executing monitoring. In one embodiment, the band generation unit 512 may also be configured to be included in the FDC monitoring unit 513.

The comparing unit 516 determines whether the monitor data is out of the band at an interval (e.g., one second) of data points constituting the master data and stores the comparison results in the database 503*d*. The comparing unit 516 repeatedly compares the data points of the monitor data with the band until the designated monitor data is not available any more, regardless of the number of data points out of the band.

When comparison of all the data points of the set monitor data with the band is completed by the comparing unit 516, the counting unit 517 counts a total number of data points out of the band based on the comparison results stored in the database 503*d*. Also, the counting unit 517 stores relevant data in the database 503*d*, which are generated by associating the counted number of data points with the values of the monitor data, the values of the master data, the band corresponding to the master data (the upper limit value and the lower limit value of the master data).

FIG. 8 is a table showing exemplary comparison results stored in the database 503d by the FDC monitoring unit 513. In the example illustrated in FIG. 8, "data8" as a monitor data value is smaller than "(md8)−5," which is the lower limit value of the band. Thus, the FDC monitoring unit 513 determines the monitor data value "data8" as a data point out of the band (determined to be "NG"). In the example illustrated in FIG. 8, only the monitor value "data8" is out of the band, and thus the counting unit 517 outputs "1" as a total number of points out of the band.

When the count value counted by the counting unit 517 exceeds a predetermined value, the determining unit 518 determines that the monitor data is abnormal, while the count value is smaller than the predetermined value, the determining unit 518 determines that the monitor data is not abnormal (normal).

FIGS. 9A and 9B are graphs illustrating the monitoring process performed by the FDC monitoring unit 513. In FIGS. 9A and 9B, the solid line is a waveform graph showing monitor data obtained in the film forming step, the horizontal axis is time, and the vertical axis is a monitor data value. Further, a band set for master data corresponding to the monitor data in the film forming step is shown as a dotted band area.

In the example illustrated in FIGS. 9A and 9B, the FDC monitoring unit 513 compares the monitor data with the band, for example, at an interval of 1 second (indicated by vertical dotted lines in the graph). When a count value determined by counting the number of data points in the monitor data being out of the band is equal to or larger than a predetermined number such as "2," the FDC monitoring unit 513 determines that the monitor data is abnormal.

FIG. 9A is a graph showing that the number of data points out of the band in a period from an initiation of the film forming step to a termination thereof is one ("1" as indicated by a vertical solid arrow). Specifically, in the example illustrated in FIG. 9A, according to the comparison of the monitor data from the film forming step with the band (generated based on the master data as a determination reference of the monitor data) at a predetermined interval (1 second in this example), a numerical value representing the counted number of the monitor data values out of the band is 1, which is less than 2 as a predetermined number, and thus the FDC monitoring unit 513 determines that the monitor data is normal.

Further, FIG. 9B is a graph showing that the number of data points out of the band in the period from an initiation of the film forming step to a termination thereof is three ("3" as indicated by vertical solid arrows). Specifically, in the example illustrated in FIG. 9B, according to the comparison of the monitor data from the film forming step with the band (generated based on the master data as a determination reference of the monitor data) at a predetermined interval (1 second in this example), a numerical value representing the counted number of the monitor data values out of the band is 3, which is greater than 2 as a predetermined number, and thus the FDC monitoring unit 513 determines that the monitor data is abnormal.

Figure 10:
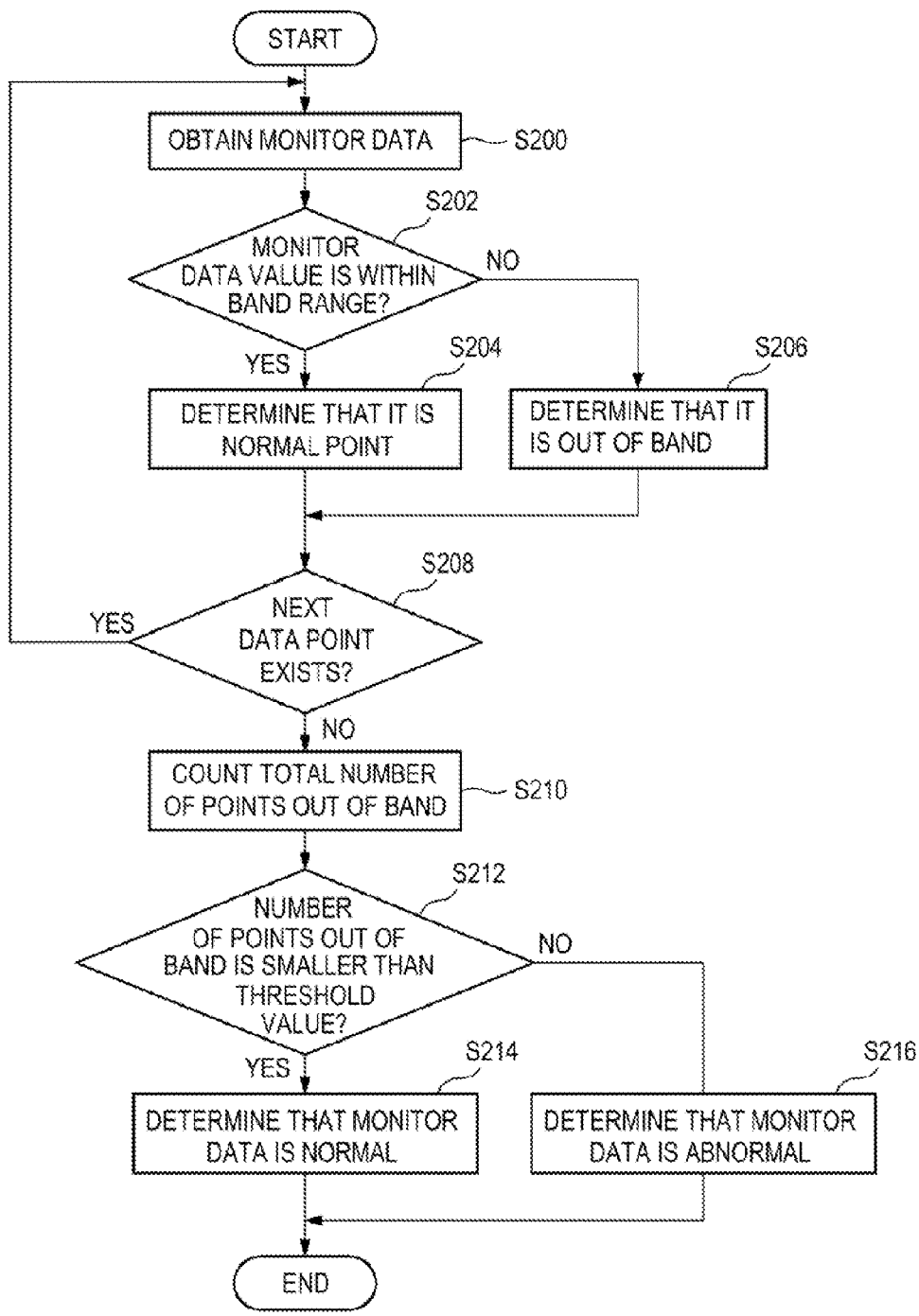
FIG. 10 is a flow chart illustrating a process of monitoring by the FDC monitoring unit.

FIG. 10 is a flow chart illustrating a process of monitoring by the FDC monitoring unit 513. Hereinafter, the flow of the monitoring by the FDC monitoring unit 513 will be described with reference to FIG. 10. If the band generation unit 512 is included in the FDC monitoring unit 513, a step of reading band data may be added before obtaining monitor data in step 200 (S200). Since the band data has been already described above, a repeated explanation thereof will be omitted.

In step 200 (S200), with respect to monitor data corresponding to an item set as a monitoring target by the setting screen 600, the comparing unit 516 reads a monitor data value from the database 503d.

In step 202 (S202), by using the band generated based on the master data as a reference for determining the monitor data as a monitoring target, the comparing unit 516 compares the monitor data value obtained in step 200 (S200) with the band. Specifically, the comparing unit 516 determines whether the monitor data value exceeds the upper limit value or the lower limit value of the band.

According to the comparison results, if the monitor data value is within the band range, i.e., if the monitor data value is equal to or less than the upper limit value and is equal to or greater than the lower limit value, the process proceeds to step 204 (S204). On the other hand, according to the comparison results, if the monitor data value is out of the band range, i.e., if the monitor data value exceeds the upper limit value or is less than the lower limit value, the process proceeds to step 206 (S206).

In step 204 (S204), the comparing unit 516 determines that the monitor data value obtained in step 200 (S200) is a normal point, and stores the comparison results ("OK") in the database 503d.

On the other hand, in step 206 (S206), the comparing unit 516 determines that the monitor data value obtained in step 200 (S200) is an abnormal point out of the band, and stores the comparison results ("NG") in the database 503d.

In step 208 (S208), the comparing unit 516 checks whether a next data point as monitor data is available from the database 503d, and if the next data point is available, the process returns to step 200 (S200). Otherwise, if the next data point as monitor data is not available any more from the database 503d, the process goes to step 210 (S210).

In step 210 (S210), the counting unit 517 counts the number of points determined to be out of the band in step 206 (S206) based on the comparison results stored in the database 503d.

In step 212 (S212), the determining unit 518 compares the count value counted in step 210 (S210) with a threshold value as a predetermined number. If the count value is less than the threshold value, the process goes to step 214 (S214). Otherwise, if the count value exceeds the threshold value, the process proceeds to step 216 (S216).

In step 214 (S214), the determining unit 518 determines that the monitor data is normal and terminates monitoring of the monitor data.

In step 216 (S216), the determining unit 518 determines that the monitor data is abnormal, displays the detection of the abnormality on the data display unit 505, and terminates monitoring of the monitor data.

The following is a description on a comparative example, which is presented as another example compared with the present embodiment. FIG. 11 is a graph explaining monitoring by a comparative example. In FIG. 11, similar to FIGS. 9A and 9B, the solid line shows a waveform representing monitor data obtained from the film forming step, the horizontal axis is time, and the vertical axis is a monitor data value. Also, a band set for the master data for the film forming step is shown as a dotted band area.

In the comparative example, if a data point of the monitor data is out of the band, the monitor data is determined to be abnormal and any subsequent determination step is not performed. In the example illustrated in FIG. 11, a data point of the monitor data at time T4 has a value out of the band. Thus, in the comparative example, although only the data point is out of the band at time T4, the monitor data is determined to be abnormal according to the comparison results for the value at time T4 and any further determination step for the values after time T5 is not executed.

In this manner, in the comparative example, even if only one point is out of the band, the monitor data is determined to be abnormal. Accordingly, any temporary noise or overshoot in the monitor data may also be determined to be abnormal, and thus fail to appropriately manage the band. On the contrary, the FDC monitoring unit 513 according to the present embodiment may perform the band management to properly process monitor data including temporary noise or overshoot.

Count Display Unit

The count display unit 514 displays the number (count value) of points out of the band at every batch on the data display unit 505 based on the foregoing relevant data stored in the database 503d.

Further, with respect to the number of points out of the band at every batch displayed on the data display unit 505, the number of batches to be displayed may be designated by an input (an input of a manipulation command, etc.) from the input unit 506. In this case, the count display unit 514 displays the monitor data and the band corresponding to the designated number of batches on the data display unit 505 based on the foregoing relevant data stored in the database 503d. If a multiple number of batches are designated, the monitor data and the band corresponding to such designated number of batches are displayed. Further, when the number of batches is designated, the master data may also be displayed, and/or any one of the monitor data, the band, and the master data may be displayed.

FIG. 12A is a graph showing an example of the number of points out of the band at all batches displayed by the count display unit 514, and FIG. 12B is a graph showing an example of displaying by the count display unit 514 when the number of points out of the band at the second batch and the fourth batch are designated to be displayed in the graph shown in FIG. 12A.

In the example illustrated in FIG. 12A, the count display unit 514 displays a graph in which the horizontal axis is the number of batches and the vertical axis is the number of points out of the band determined based on relevant data stored in the database 503d.

In the example illustrated in FIG. 12B, the count display unit 514 displays the monitor data and the band for the second batch and the fourth batch. In the example illustrated in FIG. 12B, the horizontal axis is time and the vertical axis is a data value of the monitor data. Further, the monitor data and the results of comparing the band with the monitor data by the comparing unit 516 are displayed. In the graph of FIG. 12B, the solid line in the drawing indicates the monitor data of the second batch and the dotted line indicates the monitor data of the fourth batch. Also, in the graph, the band is indicated as a dotted band area.

As shown in FIG. 12B, when the band and the monitor are displayed, it may be visually determined whether the monitor data has consecutive points out of the band or intermittent points abruptly out of the band.

Diagnosing Unit

The diagnosing unit 515 executes diagnosis of statistic including the number of points out of the band according to an abnormality diagnosis rule (to be described later) set by the setting screen 600.

The diagnosing unit 515 obtains the number (count value) of points out of the band at every batch, which is determined based on the foregoing relevant data stored in the database 503d by the counting unit 517, and diagnoses the number of points out of the band at every batch, by using a statistical process control (SPC).

The abnormality diagnosis rule is stored in the database 503d, and the diagnosis is executed by using the abnormality diagnosis rule set by the setting screen 600. The abnormality diagnosis rule set by the setting screen 500 may include one or more abnormality diagnosis rules. The diagnosing unit 515 diagnoses whether the statistic including the number of points out of the band at every batch satisfies every abnormality diagnosis rule set by the setting screen 600.

As the abnormality diagnosis rule, for example, a rule defined according to JIS Z9021 standard may be used. A plurality of abnormality diagnosis rules including, for example, "one data point exceeds a predetermined upper limit" as a first rule, "nine data points are less than a predetermined value" as a second rule, and "six data points are continuously increased" as a third rule, are stored in the database 503d.

The diagnosing unit 515 checks whether the data including the number of points out of the band at every batch as shown in FIG. 12A satisfy the abnormality diagnosis rule. If the data satisfies the abnormality diagnosis rule, the diagnosing unit 515 generates a diagnosis result indicating that the data is abnormal, and displays the diagnosis result on the data display unit 505.

Next, a second embodiment of the present disclosure will be described. This embodiment has the same configuration as the first embodiment, except that the second embodiment includes an FDC monitoring unit 519 instead of the FDC monitoring unit 513.

The FDC monitoring unit 519 has the same configuration as the FDC monitoring unit 513, except that it includes a comparing unit 520 instead of the comparing unit 516. The comparing unit 520 is different from the comparing unit 516 in that the comparing unit 520 has a time axis adjustment function and a data point number adjustment function.

Hereinafter, the time axis adjustment function will be described. When the comparing unit 520 receives an "event detection notification" indicating an occurrence of an event corresponding to monitor data as a monitoring target from the communication controller 504, the comparing unit 520 starts to compare the monitor data as a monitoring target with the band stored in the database 503d.

In the case where monitoring of, for example, the monitor data obtained from the film forming step is executed by the FDC monitoring unit 513 according to the first embodiment, for example, the timing of the substrate loading step (termination time of the substrate loading step) executed prior to the film forming step may be changed. In this case, it may be improper to compare a first data point of the monitor data obtained from the film forming step and the band determined based on the first data point of the corresponding master data. Also, the comparison results obtained by the comparing unit 516 may indicate that all of the data points are determined to be out of the band, failing to appropriately manage the band.

For this reason, when the comparing unit 520 of the FDC monitoring unit 519 according to the second embodiment receives the "event detection notification" from the communication controller 504 to compare the monitor data and the band, a start time of the comparison is adjusted such that a false determination of points out of the band can be restrained.

Next, the data point number adjustment function will be described. When the comparing unit 520 compares the data points of the monitor data and the data points of the band, if there is no data point from the monitor data to be compared with a corresponding data point from the band, the comparing unit 520 does not execute comparison.

When a band of the master data corresponding to a data point of the obtained monitor data exists in the database 503d, the comparing unit 520 executes comparison, or otherwise, the comparing unit 520 does not execute comparison. Namely, if the N-th (where N is a natural number) data point among the data points constituting the monitor data and the N-th data point among the data points constituting the master data are available for comparison, the comparing unit 520 executes comparison.

Further, when an "event termination notification" is received from the communication controller 504, the comparing unit 520 terminates comparison even when comparison with a band corresponding to every data point of the master data is not completed yet.

If the film forming step is repeatedly executed, an adhesion material is deposited on a component (e.g., a reaction tube or the like) according to the process in the film forming step, thereby changing the temperature within the processing chamber. In this case, a time for executing the film forming step may be adjusted.

For example, a time for executing the film forming step may be compared with the time for the film forming step when the master data is obtained. As a result, if it is determined that the time for executing the film forming step is lengthened through the foregoing adjustment, there may be no more data points available for the comparison when monitoring of the monitor data of the film forming step is executed by the FDC monitoring unit 513 according to the first embodiment. In this case, the counted number of points out of the band may be significant. This results from the absence of the data points as a comparison target at the end of the monitor data or at the end of the master data, for example, when the time for the film forming step is lengthened.

Figure 13:
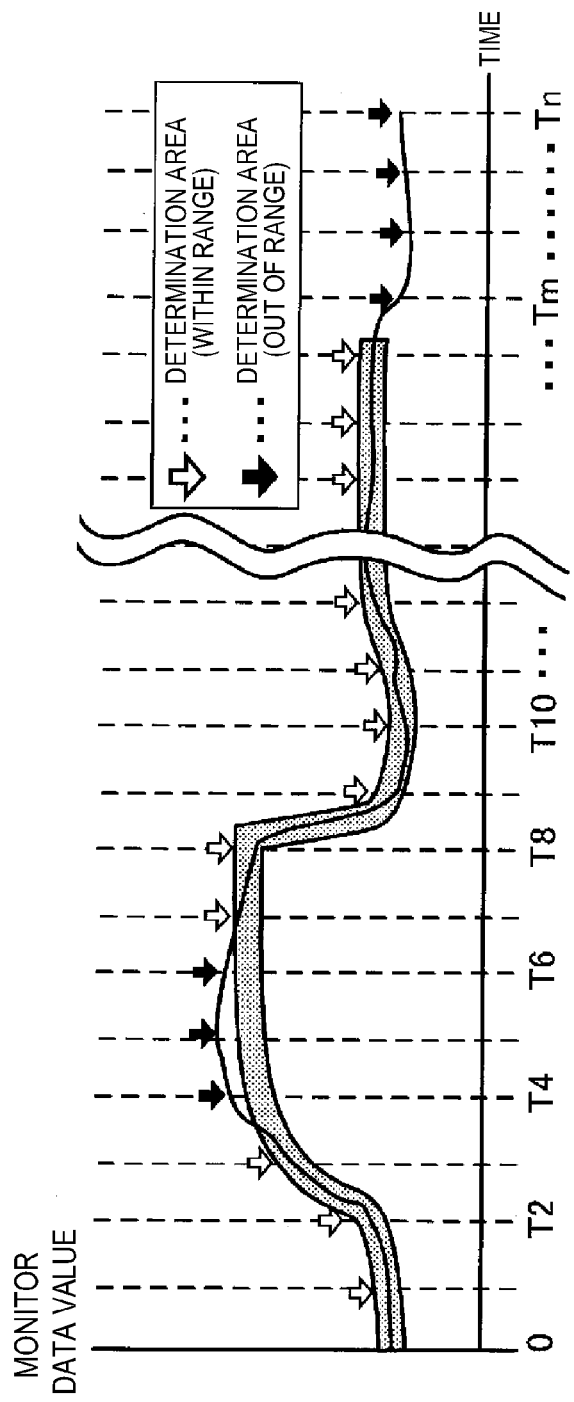
FIG. 13 is a graph showing a case in which the number of data points of the master data is smaller than that of the monitor data.

FIG. 13 is a graph showing that the number of data points in the master data is less than that of data points in the monitor data. As shown in FIG. 13, no more data points in the master data are available after time Tm. In such case, it is not desirable to compare the band and the monitor data. However, the comparing unit 516 of the FDC monitoring unit 513 according to the first embodiment executes comparison up to the last data point of the monitor data and determines that a total of seven data points are out of the band for the monitor data.

On the other hand, the comparing unit 520 of the FDC monitoring unit 519 according to the second embodiment does not execute comparison on data points after the time Tm and determines that a total of three points are out of the band for the monitor data. Thus, if the number of data points in the monitor data does not match the number of data points in the master data, the data points out of the band which have no comparison target can be discarded.

The comparing unit 520 may have one of the foregoing time axis adjustment functions and the data point number adjustment function. Further, whether to use the time axis adjustment function and/or the data point number adjustment function may be set through setting by a setting screen 620 to be described later.

Figure 14:
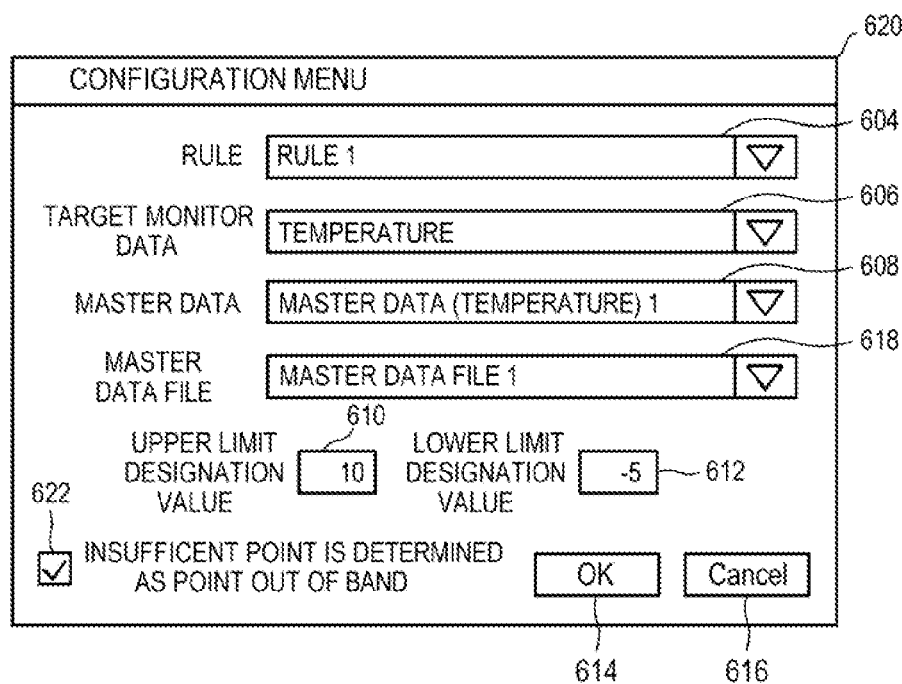
FIG. 14 is a plane view showing an example of a setting screen configured by a setting unit according to a second embodiment of the present disclosure.

FIG. 14 is a plane view showing an example of a setting screen configured by the setting unit 511 according to the second embodiment. Similar to the setting screen 600 illustrated in FIG. 5, the setting screen 620 as shown in FIG. 14 includes a selection box 604, a selection box 606, a selection box 608, an input box 610, an input box 612, a button 614, a button 616, and a selection box 618. Further, the setting screen 620 has a check box 622 for setting whether to allow the comparing unit 520 to count the number of data points (referred to as "insufficient data points"), which have no comparison target, as data points out of the band.

Counting the number of insufficient data points as data points out of the band means that the insufficient data points are determined as data points out of the band without relying on the foregoing data point number adjustment function, when the number of data points in the monitor data does not match the number of data points in the master, or when either the data points in the monitor data or the data points in the master data as a comparison target are insufficient.

Further, similar to the setting screen 600, the setting screen 620 may receive a setting using various interfacing methods including, but not limited to, the check box, the selection box, the input box, the button, and the like.

Figure 15:
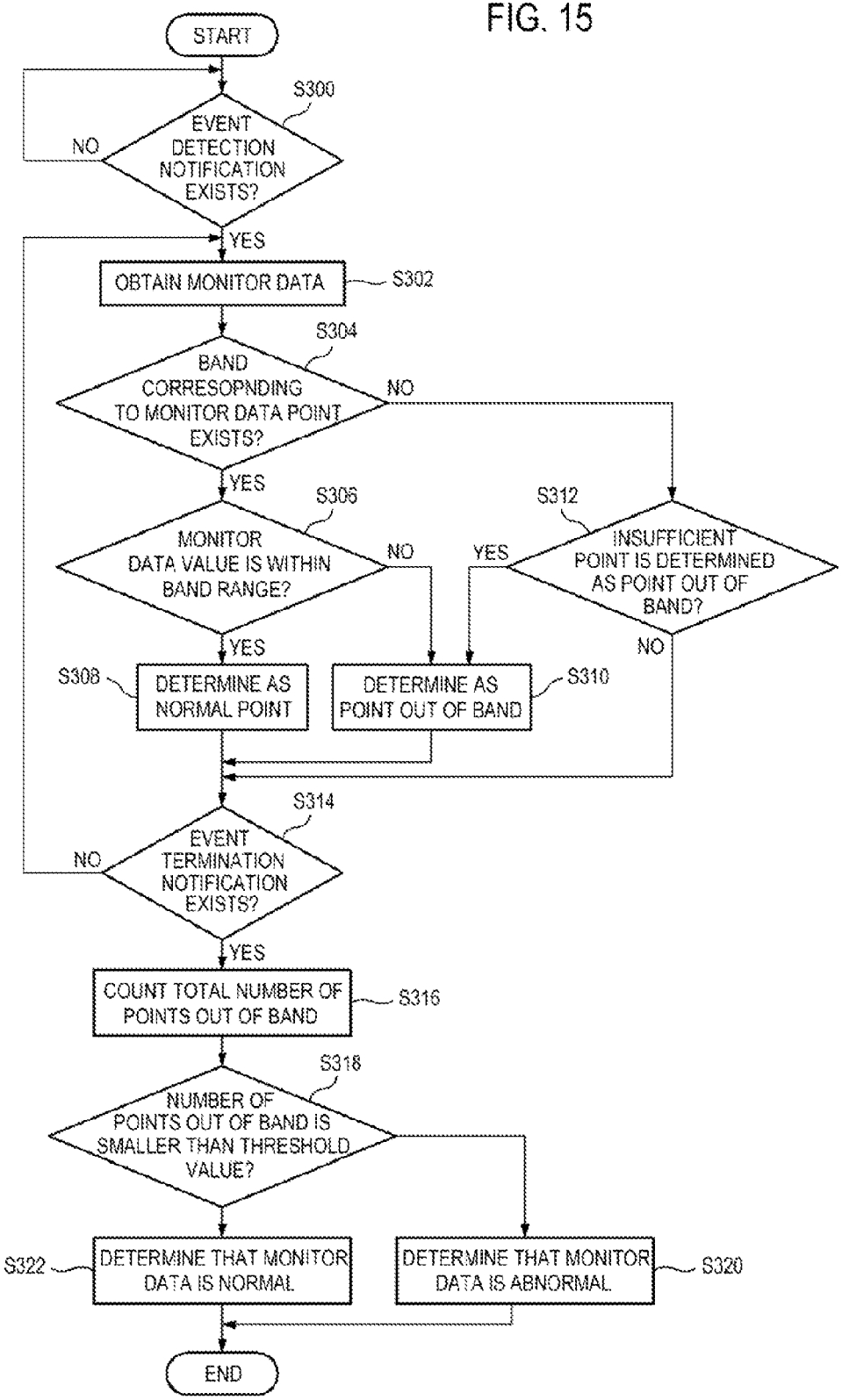
FIG. 15 is a flow chart illustrating a process of monitoring by an FDC monitoring unit.

FIG. 15 is a flow chart illustrating a process of monitoring by the FDC monitoring unit 519. Hereinafter, the flow of monitoring by the FDC monitoring unit 519 will be described with reference to FIG. 15. In this embodiment, if the FDC monitoring unit 519 is configured to include the band generation unit 512, similar to the first embodiment, a step of reading band data may be added before step 300 (S300).

In step 300 (S300), the comparing unit 520 waits until an "event detection notification" corresponding to monitor data of an item set as a monitoring target by the setting unit 511 is received from the communication controller 504. When the comparing unit 520 receives the "event detection notification," the process proceeds to step 302 (S302).

In step 302 (S302), the comparing unit 520 obtains the monitor data of the item set as a monitoring target by the setting unit 511.

In step 304 (S304), the comparing unit 520 checks whether there are data points of the master data corresponding to data points of the monitor data obtained in step 302 (S302), i.e., whether there is a band corresponding to the data points of the monitor data. If the corresponding band is found, the process proceeds to step 306 (S306), or otherwise, the process goes to step 312 (S312).

In step 306 (S306), by using the band generated based on the master data corresponding to the monitor data as a monitoring target, the comparing unit 520 compares the monitor data value obtained in step S302 (S302) with the band. Specifically, the comparing unit 520 determines whether the monitor data value is out of the upper limit value or the lower limit value set as the band.

According to the comparison results, if the monitor data value is within the band range, i.e., if the monitor data value is equal to or less than the upper limit value and is equal to or greater than the lower limit value, the process proceeds to step 308 (S308). Meanwhile, if the comparison results indicate that the monitor data value is not within the band range, i.e., if the monitor data value exceeds the upper limit value or is less than the lower limit value, the process goes to step 310 (S310).

In step 308 (S308), the comparing unit 520 determines that the monitor data value obtained in step 302 (S302) is a normal point, and stores the comparison results ("OK") in the database 503d. The process then proceeds to step 314 (S314).

On the other hand, in step 310 (S310), the comparing unit 520 determines that the monitor data value obtained in step 302 (S302) is an abnormal point out of the band, and stores the comparison results ("NG") in the database 503d. The process then proceeds to step 314 (S314).

In step 312 (S312), the comparing unit 520 checks whether an insufficient point has been set to be determined as a point out of the band by the setting unit 511. If an insufficient point has been determined as a point out of the band, the process proceeds to step 310 (S310) in which the insufficient point is determined to be a point out of the band. Otherwise, when the insufficient point has not been determined as a point out of the band, the process proceeds to step 314 (S314).

In step 314 (S314), the comparing unit 520 checks whether an "event termination notification" has been received from the communication controller 504. If the "event termination notification" has been received, the process proceeds to step 316 (S316), or otherwise, the process returns to step 302 (S302) to obtain a data point value of the next monitor data.

In step 316 (S316), the counting unit 517 counts the number of points which are determined to be out of the band in step 310 (S310) based on the comparison results stored in the database 503d.

In step 318 (S318), the determining unit 518 compares the count value counted in step 316 with a threshold value as a predetermined number. When the count value is less than the threshold value, the process proceeds to step 320 (S320), then when the count value exceeds the threshold value, the process goes to step 322 (S322).

In step 320 (S320), the determining unit 518 determines that the monitor data is normal and terminates monitoring of the monitor data.

In step 322 (S322), the determining unit 518 determines that the monitor data is abnormal, displays the detection of the abnormality on the data display unit 505, and terminates monitoring of the monitor data.

Next, a third embodiment of the present disclosure will be described. This embodiment includes a correction unit 521 in addition to the configuration of the first embodiment.

The program executed by the controller 501 includes the band generation unit 512, the setting unit 511, the FDC monitoring unit 513, the count display unit 514, the diagnosing unit 515, and the correction unit 521, in addition to the database program.

Correction Unit

The correction unit 521 executes correction of the bandwidth based on the comparison results stored in the database 503d by the FDC monitoring unit 513.

In the example illustrated in FIG. 12B described in the first embodiment, the monitor data of the second batch and that of the fourth batch are all out of the band at the data point of time T6.

As such, if data points obtained at the same time are frequently out of the band throughout the batches, it is assumed that the master data used as basic data for the band is not appropriate or it is assumed that such timing indicates an interval where the monitor data fluctuates chronically.

In the present embodiment, for the interval in which the number of points out of the band is significant throughout the batches, the bandwidth is widened to reduce an erroneous detection of the number of points out of the band, thus enhancing reliability in detecting an abnormality.

Figure 16:
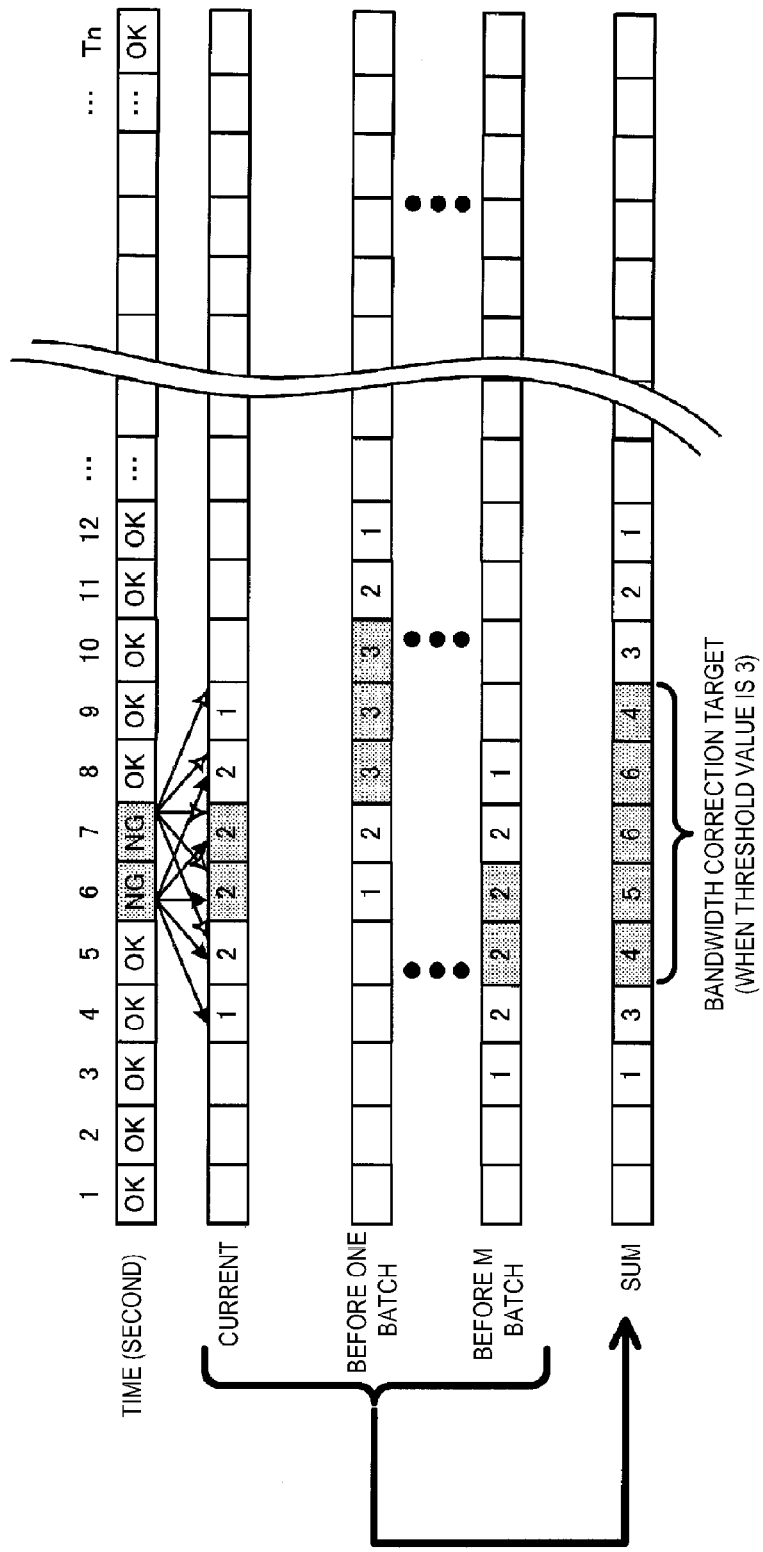
FIG. 16 is a view explaining a correction of a bandwidth by a correction unit.

FIG. 16 is a view explaining a correction of a bandwidth by the correction unit 521.

First, the correction unit 521 reads the last comparison results of batch processing executed from the database 503d, and assigns evaluation values to the respective data points constituting the master data based on the read comparison results.

If the comparison result of the N-th (where N is a natural number) data point constituting the master data is a point (NG) out of the band, the correction unit 521 assigns 1 as an evaluation value to the (N−2)-th data point, the (N−1)-th data point, the N-th data point, the (N+1)-th data point, and the (N+2)-th data point, respectively. The assignment of the evaluation value is executed for every data point out of the band according to the comparison results, and the assigned evaluation values are summed for the corresponding data point.

Further, in the above description, the evaluation value is assigned to a point out of the band as well as two points before and after the point out of the band. In some embodiments, the evaluation value may be assigned only to the point out of the band or to one point or three or more points before and after the point out of the band.

The correction unit 521 also assigns the evaluation value to the comparison results regarding the past batch processing in the same manner as described above, and sums the evaluation values at every data point constituting the master data for the predetermined number of batches.

The correction unit 521 executes correction of a bandwidth for a data point for which the sum of evaluation values exceeds a predetermined threshold value.

Figure 17:
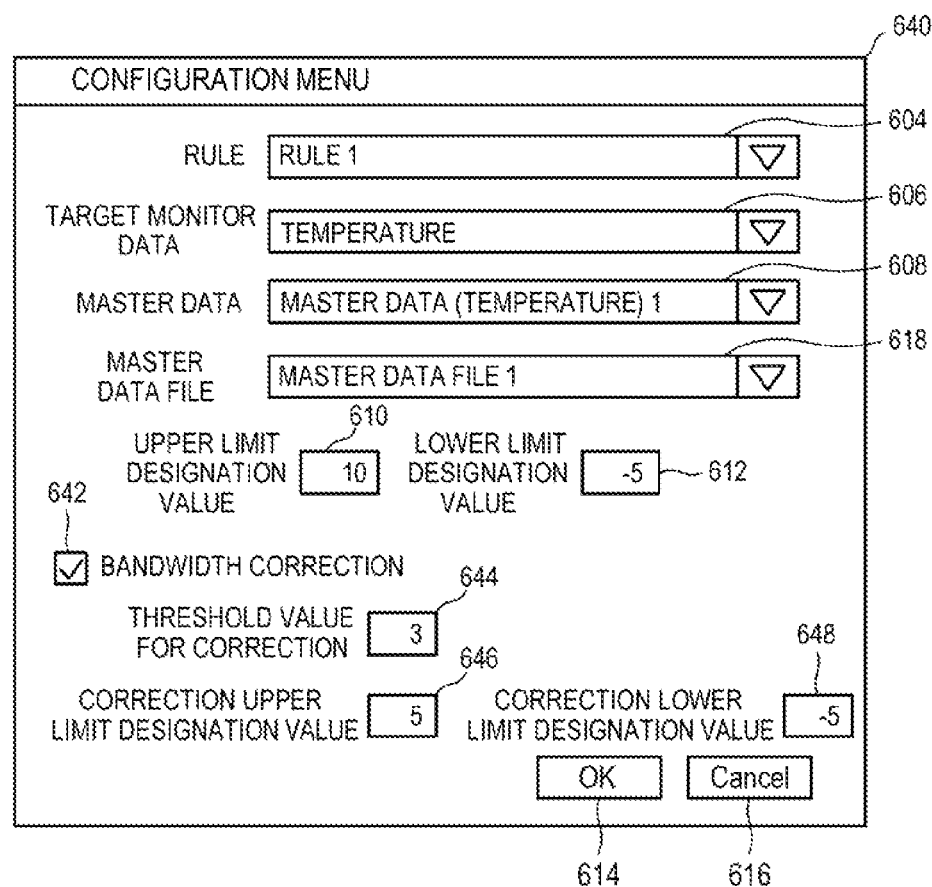
FIG. 17 is a plane view showing an example of a setting screen configured by a setting unit according to a third embodiment of the present disclosure.

FIG. 17 shows an example of a setting screen configured by the setting unit 511 according to a third embodiment of the present disclosure. Similar to the setting screen 600 illustrated in FIG. 5, a setting screen 640 illustrated in FIG. 17 includes a selection box 604, a selection box 606, a selection box 608, an input box 610, an input box 612, a button 614, a button 616, and a selection box 618.

In addition, the setting screen 640 includes a check box 642 for setting whether to execute correction by the correction unit 521, an input box 644 for receiving a threshold value for determining whether to correct a bandwidth when the sum of evaluation values exceeds a predetermined value at every batch, an input box 646 for receiving how much an upper limit value of the band is to be extended in case of correction, and an input box 648 for receiving how much a lower limit value of the band is to be reduced in case of correction.

Also, similar to the setting screen 600, the setting screen 640 may receive a setting using various methods including, but not limited to, the check box, the selection box, the input box, the button, and the like.

For example, when an input with respect to the setting screen 640 is executed from the input unit 506, the controller 501 outputs the input setting information to the band generation unit 512, the FDC monitoring unit 513, the diagnosing unit 515, and the correction unit 521.

FIG. 18 is a flow chart illustrating a process of a correction of a bandwidth by the correction unit 521. Hereinafter, the flow of the correction of the bandwidth by the correction unit 521 will be described with reference to FIG. 18.

In step 400 (S400), the correction unit 521 reads the comparison results of the lastly executed batch processing from the database 503d.

In step 402 (S402), the correction unit 521 assigns an evaluation value to a data point determined to be out of the band according to the comparison results read in step 400 (S400) and a predetermined number of previous and subsequent data points thereof.

In step 404 (S404), the correction unit 521 checks whether the assignment of the evaluation value in step 402 (S402) has been executed with respect to the comparison results of M previous batch processes, where M indicates a predetermined number of batch processes. If the assignment of the evaluation value in step 402 (S402) has been executed with respect to the comparison results of M previous batch processes, the process proceeds to step 406 (S406). Otherwise, if the assignment of the evaluation value in step 402 (S402) has not been executed with respect to the comparison results of M previous batch processes, the process returns to step S400 (S400), and comparison results of 1 previous batch process are read in a similar manner.

In step 406 (S406), the correction unit 521 sums the evaluation values at every data point constituting the master data to calculate a sum value for the M batches.

In step 408 (S408), the correction unit 521 corrects the bandwidth of a data point for which the sum value calculated in step 406 (S406) exceeds a threshold value set by the setting screen 640 based on a designation value set by the setting screen 640, and terminates the correction processing.

The correction unit 521 automatically adjusts the bandwidth based on the results of the past batch processing. Thus, in comparison to the case without the correction unit 521, the presence of the correction unit 521 reduces the manipulator's labor and improves the abnormality detection accuracy.

The third embodiment has been described to have the correction unit 521 in addition to the configuration of the first embodiment, but the foregoing correction unit 521 may also be added to the second embodiment.

Further, in the above description, the monitor data in the film forming step has been described by way of example, but all of the first, second, and third embodiments are not limited to the monitor data in the film forming step and may be applied to monitor data with respect to any event.

Also, there is no need to dispose the management device on the same floor (clean room) as that of the substrate processing apparatus, and may be disposed, for example, in an office through a LAN connection. Furthermore, in the management device, the storage unit (database), the controller, the input unit, and the data display unit are not necessarily integrated but may be separately configured to remotely interpret data of the database disposed in the clean room by an input unit (terminal device) disposed in the office.

In some embodiments, a device for processing a glass substrate, such as an LCD device, as well as a semiconductor manufacturing apparatus, may be employed as the substrate processing apparatus. Also, similarly, an etching device, an exposing device, a lithography device, a coating device, a mold device, a developing device, a dicing device, a wire bonding device, an inspection device, or the like may be employed as a substrate processing apparatus.

Additionally, the film forming processing includes, for example, CVD, PVD, ALD, Epi, processing for forming an oxide film or a nitride film, processing for forming a film including metal, and the like. Also, the film forming processing may include processing such as annealing, oxidization, diffusion, and the like.

While the present disclosure has been shown and described with respect to the particular embodiments, it should be understood by those skilled in the art that the present disclosure is not limited thereto but various changes may be made without departing the gist of the present disclosure.

The present disclosure features the matters described in claims, but the following matters are added as other aspects of the present disclosure.

(1) A management device, wherein the setting unit displays a setting screen for receiving the item of the measurement data as the determination target, the reference data, and the upper and lower limit values.

(2) A management device, wherein when both a data point constituting the measurement data corresponding to the item set by the setting unit and a data point constituting the reference data set by the setting unit exist, the counting unit counts the number of data points that exceeds the upper and lower limit values.

(3) A management device, wherein the counting unit compares a data point corresponding to a first data point constituting the reference data set by the setting unit, among the measurement data stored in the measurement data storing unit, as a first data point of the measurement data of the item set by the setting unit, and counts the number of data points that exceeds the upper and lower limit values.

(4) A management device that includes a diagnosing unit configured to diagnose the measurement data as the determination target, among the measurement data stored in the measurement data storage unit, is abnormal when a data sequence comprised of the counted numbers counted by the counting unit for respective processing executed by the substrate processing apparatus satisfies a predetermined rule.

(5) A management device that includes a correction unit configured to correct upper and lower limit values of a data point whose measurement data corresponding to the item set by the setting unit exceeds the upper and lower limit values of the reference data by a predetermined number of times throughout a plurality of processing executed by the substrate processing apparatus, among the data points constituting the reference data set by the setting unit.

(6) A data analysis method including: storing measurement data transmitted from a substrate processing apparatus for processing a substrate; setting an item of the measurement data in a predetermined measurement range, reference data as a determination reference of the measurement data corresponding to the item, and upper and lower limit values with respect to the reference data; counting the number of times that the value of the measurement data corresponding to the item exceeds the upper and lower limit values with respect to the reference data; and determining that the measurement data is abnormal, when the counted number exceeds a predetermined value.

(7) A substrate processing system, including a management device having a substrate processing apparatus for processing a substrate, a measurement data storage unit for storing measurement data transmitted from the substrate processing apparatus, a setting unit configured to set an item of the measurement data as a determination target among the measurement data stored in the measurement data storage unit, reference data as a determination reference of the measurement data corresponding to the item, and upper and lower limit values with respect to the reference data; a counting unit configured to count the number of times that the value of the measurement data corresponding to the item set by the setting unit exceeds the upper and lower limit values with respect to the reference data set by the setting unit; and a determining unit configured to determine that the determination target measurement data is abnormal, when the number counted by the counting unit exceeds a predetermined value.

According to the present disclosure in some embodiments, it is possible to execute data management with high reliability even on data having temporary noise or overshoot.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A management device for determining an abnormality in a batch process of a substrate, the management device comprising:
    a communication unit configured to receive substrate processing data from a substrate processing apparatus;
    a measurement data storage unit configured to store the substrate processing data received from the communication unit, wherein the substrate processing data comprises at least one of temperature data, gas flow rate data and pressure data;
    a setting unit configured to set one of the substrate processing data as a determining target, set reference data as a determining reference of the corresponding substrate processing data, set an upper limit value and a lower limit values for each data value of the reference data, and set a band defined within the range higher than the lower limit value with respect to the reference data and lower than the upper limit value with respect to the reference data;
    a comparing unit configured to compare each data of the substrate processing data with each data of the corresponding reference data in a corresponding point in time of the batch process, and identify each data that are determined to fall outside the band;
    a correction unit configured to assign an evaluation value to a data point, of a plurality of data points, determined to fall outside the band and further increment the evaluation value of a predetermined number of previous data points and subsequent data points of the plurality of the data points, and repeat the evaluation value assigning process for a predetermined number of batch processes, and sum the evaluation values of each corresponding data point after the predetermined number of batch processes, and automatically correct the upper limit of the band and the lower limit of the band of a batch process having a summed evaluation value of a data point that exceeds a predetermined threshold value set by the setting unit;
    a counting unit configured to count the number of times that the substrate processing data falls outside the band for a current batch process, wherein the counting unit is executed after the correction unit;
    a determining unit configured to determine whether the substrate processing data is abnormal, when the counted number counted by the counting unit exceeds a predetermined value; and
    a controller configured to transmit a signal to the substrate processing apparatus to control an operation of a processing furnace of the substrate processing apparatus when the determining unit determines that the substrate processing data is abnormal to prevent defective manufacturing.

2. The management device of claim 1, further comprising:
    a relevance storage unit configured to store the substrate processing data set by the setting unit, the reference data as a determining reference of the substrate processing data, the upper and lower limit values with respect to the reference data, and the counted number counted by the counting unit by relating them as relevant data; and
    a display unit configured to display counted numbers for respective processing executed by the substrate processing apparatus, with respect to the counted number stored in the relevance storage unit.

3. The management device of claim 2, wherein the display unit additionally displays, in response to a designation of at least one counted number among the displayed counted numbers for respective processing executed by the substrate processing apparatus, at least the substrate processing data stored in the relevance storage unit in relation with the designated counted number.

4. The management device of claim 2, wherein the display unit displays a setting screen for receiving a designation for an item of the substrate processing data, the reference data, and the upper and lower limit values.

5. The management device of claim 1, wherein the counting unit counts the number of data points that falls outside the band when both a data point constituting the corresponding substrate processing data and a data point constituting the corresponding reference data exist.

6. The management device of claim 1, wherein the counting unit compares a data point corresponding to a first data point constituting the reference data set by the setting unit, the data point selected from the substrate processing data stored in the measurement data storing unit, with a first data point of the substrate processing data set by the setting unit, and counts the number of data points that falls outside the band.

7. The management device of claim 1, further comprising a diagnosing unit configured to diagnose whether the substrate processing data as a determining target, among the substrate processing data stored in the measurement data storage unit, is abnormal when the counted numbers counted by the counting unit for respective processing executed by the substrate processing apparatus satisfies a predetermined rule.

8. A substrate processing system comprising:
    the substrate processing apparatus according to claim 1; and
    the management device according to claim 1.

9. The management device of claim 1, wherein the counting unit further counts the substrate processing data received from the substrate processing apparatus during an initiation and a termination of a film forming step, when executing a process recipe including at least one of a substrate loading step, the film forming step and a substrate unloading step.

10. The management device of claim 1, wherein the comparison of the substrate processing data and the band by the comparing unit is controlled by an event initiation and termination notification.

11. The management device of claim 1, the setting unit displays a setting screen configured to receive a monitoring item, the reference data, and the upper limit value and the lower limit value for each data value of the reference data.

12. The management device of claim 11, wherein a setting screen comprises an item to indicate a data point, of the plurality of data points, to be out of the band when a number of data points of the substrate processing data and a number of data points of the reference data is different, and the number of data points of the reference data or the number of data points of the substrate processing data being compared is insufficient.

13. The management device of claim 11, wherein a setting screen comprises an item indicating a threshold value for correcting the width defined by the upper limit value and the lower limit value of each data value of the reference data.

14. The management device of claim 1, wherein the comparing unit compares the data points in the band defined by adding the upper limit value and the lower limit value of the reference data to the reference data with the data points of the substrate processing data at an interval of the data points consisting of the reference data and repeatedly compares the data points of the substrate processing data until the substrate processing data set by the setting unit is not available any more.

15. The management device of claim 1, wherein the communication unit is further configured to transmit a signal triggering the substrate processing apparatus to terminate a substrate processing process performed by the substrate processing apparatus to indicate the batch process is abnormal.

16. A method of controlling a substrate processing apparatus, the method comprising:
  receiving substrate processing data from the substrate processing apparatus;
  storing the substrate processing data, wherein the substrate processing data comprises at least one of temperature data, gas flow rate data and pressure data;
  setting one of the substrate processing data as a determining target, setting reference data as a determining reference of the corresponding substrate processing data, setting upper and lower limit values with respect to the reference data, and setting a band defined within the range higher than the lower limit value with respect to the reference data and lower than the upper limit value with respect to the reference data;
  comparing each data of the substrate processing data with each data of the corresponding reference data in a corresponding point in time of a batch process and identifying each data that are determined to fall outside the band;
  assigning an evaluation value to the data point determined to fall outside the band and further incrementing the evaluation value of a predetermined number of previous and subsequent data points, and repeating the evaluation value assigning process for a predetermined number of batch processes, and summing the evaluation values of each corresponding data point after the predetermined number of batch processes, and automatically correcting the upper limit of the band and the lower limit of the band of a batch process having a summed evaluation value of a data point that exceeds a predetermined threshold value;
  counting the number of times that the substrate processing data falls outside the band for a current batch process, wherein the counting is executed after the correcting;
  determining whether the substrate processing data is abnormal, when the counted number exceeds a predetermined value; and
  transmitting, by a controller, a signal to the substrate processing apparatus to control an operation of a processing furnace of the substrate processing apparatus when the substrate processing data is determined to be abnormal to prevent defective manufacturing.

17. A tangible, non-transitory computer-readable recording medium storing thereon program for causing a computer to execute a method of monitoring substrate processing data transmitted from a substrate processing apparatus for processing configured to process a substrate and control the substrate processing apparatus, the program comprising:
  setting one of the substrate processing data as a determining target, setting reference data as a determining reference of the corresponding substrate processing data, setting upper and lower limit values with respect to the reference data, and setting a band defined within the range higher than the lower limit value with respect to the reference data and lower than the upper limit value with respect to the reference data;
  comparing each data of the substrate processing data with each data of the corresponding reference data in a corresponding point in time of a batch process and identifying each data that are determined to fall outside the band;
  assigning an evaluation value to the data point determined to fall outside the band and further incrementing the evaluation value of a predetermined number of previous and subsequent data points, and repeating the evaluation value assigning process for a predetermined number of batch processes, and summing the evaluation values of each corresponding data point after the predetermined number of batch processes, and automatically correcting the upper limit of the band and the lower limit of the band of a batch process having a summed evaluation value of a data point that exceeds a predetermined threshold value;
  counting the number of times that the substrate processing data falls outside the band for a current batch process, wherein the counting is executed after the correcting;
  determining whether the substrate processing data is abnormal, when the counted number exceeds a predetermined value; and
  transmitting, by a controller, a signal to the substrate processing apparatus to control an operation of a processing furnace of the substrate processing apparatus when the substrate processing data is determined to be abnormal to prevent defective manufacturing.

* * * * *